(12) United States Patent
Ohara et al.

(10) Patent No.: US 8,862,282 B2
(45) Date of Patent: *Oct. 14, 2014

(54) ENERGY SUPPLY SYSTEM
(71) Applicant: Panasonic Corporation, Kodama (JP)
(72) Inventors: Hideo Ohara, Osaka (JP); Masataka Ozeki, Osaka (JP); Yoshikazu Tanaka, Shiga (JP); Kunihiro Ukai, Nara (JP)
(73) Assignee: Panasonic Corporation, Osaka (JP)
( * ) Notice: Subject to any disclaimer, the term of this patent is extended or adjusted under 35 U.S.C. 154(b) by 0 days.

This patent is subject to a terminal disclaimer.

(21) Appl. No.: 13/943,342
(22) Filed: Jul. 16, 2013
(65) Prior Publication Data
US 2013/0304274 A1 Nov. 14, 2013

Related U.S. Application Data
(63) Continuation of application No. 13/060,584, filed as application No. PCT/JP2010/001481 on Mar. 4, 2010, now Pat. No. 8,577,511.

(30) Foreign Application Priority Data

Mar. 23, 2009 (JP) .................................. 2009-069468
Feb. 26, 2010 (JP) .................................. 2010-041762

(51) Int. Cl.
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G05B 13/02 | (2006.01) |
| H01M 8/04 | (2006.01) |
| F24D 19/10 | (2006.01) |

(52) U.S. Cl.
CPC ............ G05B 13/02 (2013.01); F24H 2240/00 (2013.01); Y02B 90/12 (2013.01); H01M 8/0494 (2013.01); F24D 2200/19 (2013.01); H01M 2250/405 (2013.01); Y02B 90/16 (2013.01); F24D 19/1048 (2013.01); Y02E 20/14 (2013.01); Y02E 60/50 (2013.01); H01M 2250/402 (2013.01)
USPC ........................... 700/295; 700/286; 700/297

(58) Field of Classification Search
USPC .................................... 700/22, 286, 295, 297
See application file for complete search history.

(56) References Cited

U.S. PATENT DOCUMENTS 4,634,843 A * 1/1987 Payne ........................... 219/486
6,434,957 B1 * 8/2002 Nishizuka et al. ............... 62/175
(Continued)

FOREIGN PATENT DOCUMENTS

| GB | 2408112 A | 5/2005 |
| JP | 2003-061245 A | 2/2003 |

(Continued)

OTHER PUBLICATIONS

Decision on Grant from counterpart Russian Application No. 2011109007/06, dated Jan. 25, 2013, 21 pages (with translation).

(Continued)

*Primary Examiner* — Ramesh Patel
(74) *Attorney, Agent, or Firm* — McDermott Will & Emery LLP

(57) ABSTRACT

An energy supply system includes: an energy supply device configured to supply electric power and/or heat; and a controller configured to set a first maximum operation time of a first specified period including a plurality of second specified periods, the first maximum operation time being an upper limit of an operation time of the energy supply device in the first specified period; calculate and set a second target maximum operation time of each of the second specified periods of the first specified period such that the operation time of the energy supply device in the first specified period does not exceed the first maximum operation time, the second target maximum operation time being a target value of an upper limit of the operation time of the energy supply device in the second specified period; and reconfigure the second target maximum operation time of a future second specified period of a certain first specified period based on a time in which the energy supply device has been actually operated in a past second specified period of the certain first specified period.

8 Claims, 12 Drawing Sheets

(56) References Cited

U.S. PATENT DOCUMENTS

| | | | |
|---|---|---|---|
| 7,012,223 B2 * | 3/2006 | Kopel | 219/494 |
| 7,101,816 B2 * | 9/2006 | Kaushal et al. | 438/795 |
| 7,155,318 B2 * | 12/2006 | Sharma et al. | 700/276 |
| 7,444,096 B2 * | 10/2008 | Lowman et al. | 399/88 |
| 7,833,669 B2 * | 11/2010 | Aso et al. | 429/428 |
| 7,984,628 B2 * | 7/2011 | Nishio et al. | 68/12.01 |
| 8,209,040 B2 * | 6/2012 | Sekiai et al. | 700/47 |
| 8,577,511 B2 * | 11/2013 | Ohara et al. | 700/295 |
| 8,577,512 B2 * | 11/2013 | Kaneko et al. | 700/295 |
| 2005/0164046 A1 * | 7/2005 | Fujihara et al. | 429/12 |
| 2010/0040915 A1 * | 2/2010 | Wakita et al. | 429/17 |
| 2010/0081021 A1 * | 4/2010 | Taguchi et al. | 429/19 |
| 2010/0291451 A1 * | 11/2010 | Tamura et al. | 429/429 |

FOREIGN PATENT DOCUMENTS

| | | |
|---|---|---|
| JP | 2005-063903 A | 3/2005 |
| JP | 2006-125701 A | 5/2006 |
| JP | 2006-125703 A | 5/2006 |
| JP | 2006-127967 A | 5/2006 |
| JP | 2007-309598 A | 11/2007 |
| JP | 2007-323843 A | 12/2007 |
| RU | 2296305 C1 | 3/2007 |

OTHER PUBLICATIONS

International Search Report for International Application No. PCT/JP2010/001481, dated Apr. 27, 2010, 2 pages.

* cited by examiner

ENERGY SUPPLY SYSTEM

RELATED APPLICATIONS

This application is a continuation application of application Ser. No. 13/060,584 filed Feb. 24, 2011, which is a 371 application of PCT/JP2010/001481 having an international filing date of Mar. 4, 2010, which claims priority to JP 2010-041762 filed Feb. 26, 2010 and JP 2009-069468 filed Mar. 23, 2009.

TECHNICAL FIELD

The present invention relates to an energy supply system configured to supply electric power, heat, and the like.

BACKGROUND ART

Known as an energy supply system are a gas engine power generator and a gas engine cogeneration system. In recent years, a fuel cell cogeneration system configured to use a fuel cell to supply both electric power and heat is especially attracting attention as the energy supply system.

Already developed is a fuel cell cogeneration system which includes: a means for measuring an electric power load (electric power consumption energy) and a heat load (heat consumption energy by hot-water supply or the like); a demand predictor configured to predict a future demand of the electric power load and a future demand of the heat load from past load histories detected by this measuring device; and an operation planning device configured to generate an operation pattern of the fuel cell cogeneration system based on a future hot-water supply demand predicted by the demand predictor, and this fuel cell cogeneration system operates to maximize a consumed energy reduction amount and a discharged carbon dioxide reduction amount at an object for which the system is provided (see PTL 1 for example). In accordance with the fuel cell cogeneration system of this conventional example, a combination of a start-up time and stop time of the fuel cell cogeneration system is determined such that the consumed energy reduction amount and the discharged carbon dioxide reduction amount are maximized.

The fuel cell cogeneration system starts up at the determined start-up time, operates while sequentially changing the generated electric power of the system in accordance with the electric power load, and stops at the stop time.

Also proposed is a method for operating a fuel cell configured to create an operation plan of the fuel cell based on a service life (see PTL 2 for example).

Also proposed is a method for planning the operation of a cogeneration device configured to predict the load from the past load history and determine an operation time period based on the predicted load (see PTL 3 for example).

PATENT LITERATURE

PTL 1: Japanese Laid-Open Patent Application Publication No. 2007-309598
PTL 2: Japanese Laid-Open Patent Application Publication No. 2007-323843
PTL 3: Japanese Laid-Open Patent Application Publication No. 2003-61245

SUMMARY OF THE INVENTION

Technical Problem

In accordance with conventional fuel cells and cogeneration devices, although optimization is considered to some extent at the stage of creating the operation plan, the operation plan may not fit the actual situation depending on the actual operation situation, so that an inappropriate operation may be carried out.

The present invention was made in light of the above circumstances, and an object of the present invention is to provide an energy supply system configured to create an operation plan and capable of optimizing the operation plan in accordance with the actual operation situation, a device guaranteed operation period, an operation time life, and the like.

Solution to Problem

The present inventors have diligently studied to solve the above problems. As a result, the following findings are obtained.

To be specific, in a case where the energy supply system using, for example, the fuel cell operates based on the operation plan created before the operation, the energy supply system may operate when the operation is unnecessary or may not operate when the operation is necessary.

Specifically, for example, in a case where hot water adequately remains in a hot water storage and it is unnecessary to generate the hot water, the system needs to stop. If the system operates based on the operation plan created in advance under such situation, the energy efficiency deteriorates.

Moreover, for example, in a case where the amount of hot water consumption is large and the hot water needs to be generated more than usual, the system needs to be flexibly operated to generate the hot water. If the system consistently operates based on the operation plan created in advance under such situation, the energy efficiency deteriorates.

Here, the present inventors have found that: regarding an operation period of the energy supply system, a first specified period and a plurality of second specified periods included in the first specified period are set; in the first specified period, the system does not operate for a maximum operation time or more; and target operation times are shared among the second specified periods included in the same first specified period. With this configuration, the system can flexibly operate in accordance with the actual operation situation, so that the operation plan can be optimized.

In order to solve the above problems, an energy supply system of the present invention includes: an energy supply device configured to supply at least one of electric power and heat; and a controller configured to: set a first maximum operation time of a first specified period including a plurality of second specified periods, the first maximum operation time being an upper limit of an operation time of the energy supply device in the first specified period; calculate and set a second target maximum operation time of each of the second specified periods of the first specified period based on the first maximum operation time such that the operation time of the energy supply device in the first specified period does not exceed the first maximum operation time, the second target maximum operation time being a target value of an upper limit of the operation time of the energy supply device in the second specified period; and reconfigure the second target maximum operation time of a future second specified period of a certain first specified period based on a time in which the energy supply device has been actually operated in a past second specified period of the certain first specified period.

With this configuration, the energy supply system configured to create the operation plan can optimize the operation plan in accordance with the actual operation situation.

The above object, other objects, features and advantages of the present invention will be made clear by the following detailed explanation of preferred embodiments with reference to the attached drawings.

Advantageous Effects of Invention

The energy supply system of the present invention is an energy supply system configured to create the operation plan and can optimize the operation plan in accordance with the actual operation situation.

DETAILED DESCRIPTION OF THE PREFERRED EMBODIMENTS

Figure 1:
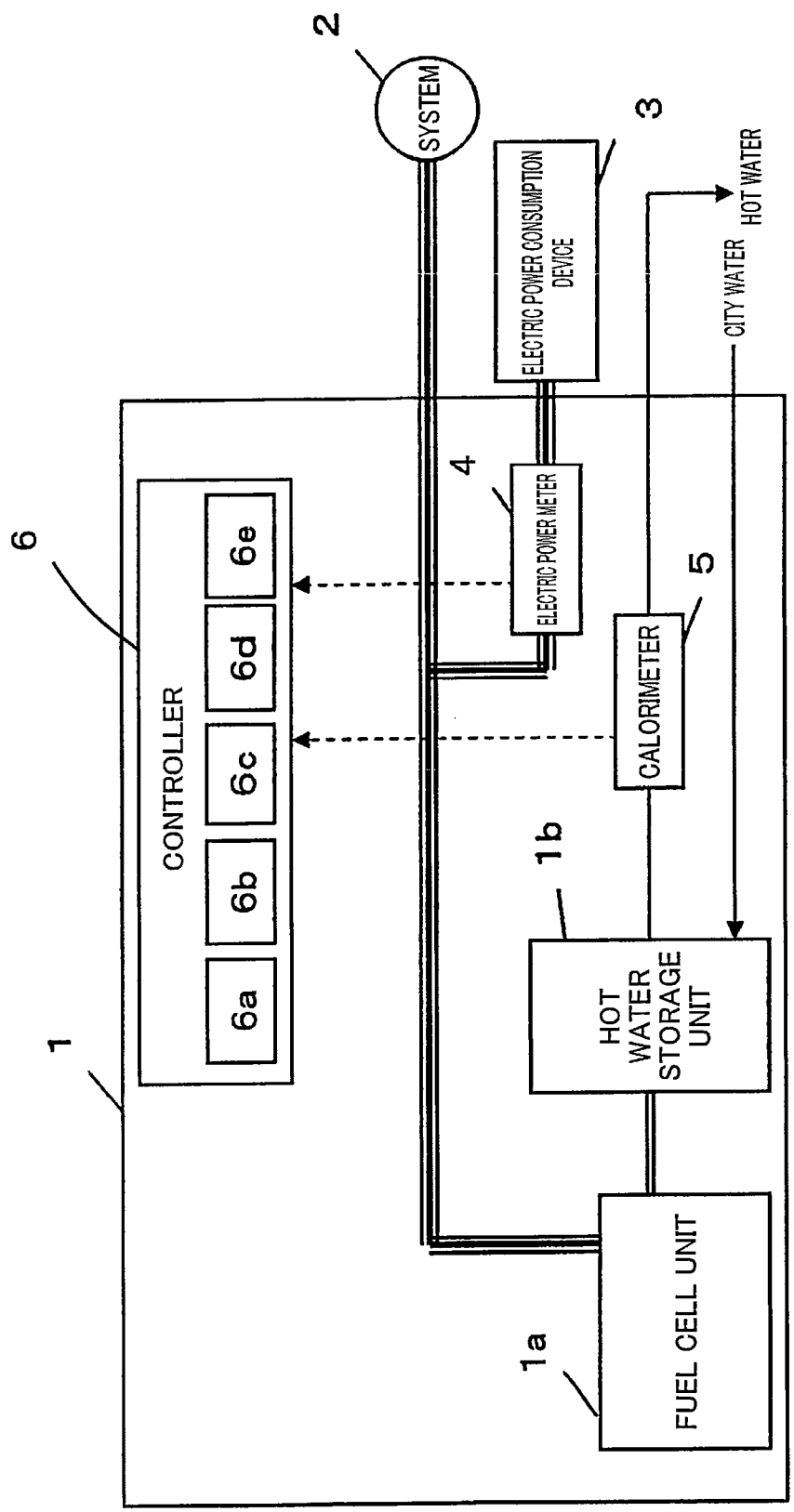
FIG. 1 is a block diagram showing a configuration example of a cogeneration system according to Embodiment 1 of the present invention.

Hereinafter, embodiments of the present invention will be explained in reference to the drawings.

An energy supply system of an embodiment of the present invention includes: an energy supply device (for example, a fuel cell unit 1a shown in FIG. 1) configured to supply at least one of electric power and heat; and a controller (for example, a controller 6 shown in FIG. 1) configured to; set a first maximum operation time of a first specified period including a plurality of second specified periods, the first maximum operation time being an upper limit of an operation time of the energy supply device in the first specified period; calculate and set a second target maximum operation time of each of the second specified periods of the first specified period based on the set first maximum operation time such that the operation time of the energy supply device in the first specified period does not exceed the first maximum operation time, the second target maximum operation time being a target value of an upper limit of the operation time of the energy supply device in the second specified period; and reconfigure the second target maximum operation time of a future second specified period of a certain first specified period based on a time in which the energy supply device has been actually operated in a past second specified period of the certain first specified period.

With this configuration, the energy supply system configured to create the operation plan can optimize the operation plan in accordance with the actual operation situation.

In the energy supply system, the first specified period may be a period shorter than a guaranteed operation period of the energy supply device, and the controller may be configured to set the first maximum operation time such that the operation time of the energy supply device does not reach an operation time life of the energy supply device before the guaranteed operation period lapses.

With this configuration, a possibility that the operation time reaches the operation time life before the guaranteed operation period lapses can be reduced, and the life of the device can be increased.

In the energy supply system, the controller may be configured to change the number of second specified periods of the first specified period in accordance with a predetermined pattern.

In the energy supply system, the number of second specified periods of the first specified period may be a constant value.

In the energy supply system, the first specified period may be a period equal to or shorter than one year.

In the energy supply system, the second specified period may be a period equal to or shorter than one month.

In the energy supply system, the controller may be configured to set the first maximum operation time and/or the second target maximum operation time such that an energy cost reduction amount per unit operation time is maximum.

In the energy supply system, the controller may be configured to set the first maximum operation time and/or the second target maximum operation time such that an energy consumption of the energy supply device is minimum.

In the energy supply system, the energy supply device may be a heat-electric power supply device configured to supply the electric power and the heat and includes a heat accumulator configured to accumulate the heat generated by a heat-electric power supply system, and the controller may be configured to operate such that the heat accumulated by the heat accumulator is maximum.

The energy supply system may include an operating device (for example, a remote controller 7 shown in FIG. 8) via which a start-up time and stop time of the energy supply device are input.

In the energy supply system, the controller may be configured to change the first maximum operation time and/or the second target maximum operation time in accordance with an environmental condition In the energy supply system, the controller may be configured to change the number of second specified periods of the first specified period in accordance with an environmental condition.

In the energy supply system, the environmental condition may include at least one selected from the group consisting of season information, calendar information, an outside air temperature, and a city water temperature.

In the energy supply system, the controller may be configured to update the first maximum operation time based on an integrated operation time of the energy supply device.

In the energy supply system, the controller may be configured to calculate and integrate a difference between the first maximum operation time and operation time of the energy supply device within the first specified period to obtain integrated surplus operation time, and store the integrated surplus operation time, when the operation time of the energy supply device within the first specified period is shorter than the first maximum operation time.

In the energy supply system, the controller may be configured to reconfigure the first maximum operation time in a case where the integrated surplus operation time has become a preset third specified period.

(Embodiment 1)

FIG. 1 is a block diagram showing a configuration example of a cogeneration (heat-electric power supply) system according to an embodiment of the present invention and shows a fuel cell cogeneration system as one example of the cogeneration system.

A cogeneration system 1 of the present embodiment includes: a fuel cell unit 1a configured to generate electric power by a fuel cell; and a hot water storage unit 1b configured to increase the temperature of city water by using heat generated simultaneously with the electric power by the fuel cell of the fuel cell unit 1a and store the city water as hot water. The electric power generated by the fuel cell unit 1a is supplied to an electric power consumption device 3 together with the electric power supplied from an electric power system 2.

The amount of the electric power load consumed by the electric power consumption device 3 is measured by an electric power meter 4 and sequentially accumulated in a memory 6a of a controller 6.

Moreover, the hot water stored in the hot water storage unit 1b is supplied through a faucet or the like as the hot water. The amount of the heat load utilized as the hot water is measured by a calorimeter 5 and sequentially accumulated in the memory 6a of the controller 6.

For example, the calorimeter 5 includes a temperature sensor (not shown) configured to measure the temperature of the city water, a temperature sensor (not shown) configured to measure the temperature of the hot water supplied from the hot water storage unit 1b, and a flow meter (not shown) configured to measure the flow rate of the hot water supplied from the hot water storage unit 1b. The calorimeter 5 calculates the amount of the heat load utilized as the hot water by multiplying the temperature difference between the city water and the hot water by the flow rate of the hot water.

Moreover, the fuel cell cogeneration system 1 includes a backup hot-water supply device (not shown) in order to supply the hot water even in a case where the hot water in the hot water storage unit 1b has run out.

The controller 6 controls the operations of the fuel cell unit 1a and the energy supply system 1.

Further, the controller 6 includes a demand predictor 6b, an operation planning device 6c, a maximum operation time setting device 6d, and a period setting device 6e. The demand predictor 6b predicts a time series pattern of a future electric power load generation and future heat load generation from an electric power load generation history and heat load generation history accumulated in the memory 6a. The operation planning device 6c determines a start-up time and stop time of the fuel cell cogeneration system based on a predicted value of the time series pattern of the electric power load generation and heat load generation predicted by the demand predictor 6b. The maximum operation time setting device 6d sets a maximum operation time in a specified period. The period setting device 6e sets the specified period.

The demand predictor 6b reads out a heat load demand generation history and electric power load demand generation history of the specified period (one year, for example), the histories being stored in the memory 6a. Based on the histories, the demand predictor 6b estimates and calculates a predicted demand of the electric power load of a future specified period (one day, for example) which changes by time transition and a predicted demand of the heat load of a future specified period (one day, for example) which changes by time transition (hereinafter, these demands are respectively abbreviated as "predicted electric power load demand" and "predicted heat load demand"). Then, the predicted electric power load demand and the predicted heat load demand are sequentially stored in the memory 6a.

It is desirable that an accumulated period of the past electric power load and an accumulated period of a heat consumption history of the past heat load necessary for estimating the predicted electric power load demand and the predicted heat load demand be a period in which the fuel cell cogeneration system of the present embodiment can appropriately recognize a consumption cycle of the electric power and heat at an object for which the system is provided. For example, in a case where the fuel cell cogeneration system is provided at general home, the accumulated period is about several days to several months.

Moreover, various methods for estimating the predicted electric power load demand and the predicted heat load demand from the electric power load generation history and the heat load generation history have already been proposed, so that detailed explanations of such methods are omitted herein.

The operation planning device 6d sets a first maximum operation time of a first specified period (one week, for example) such that an operation time of the fuel cell unit 1a does not reach an operation time life (40,000 hours, for example) of the fuel cell unit 1a before a guaranteed operation period (10 years, for example) of the fuel cell unit 1a lapses.

Note that the first specified period is shorter than the guaranteed operation period, and the first maximum operation time is an upper limit of the operation time of the fuel cell unit 1a in the first specified period. Based on the set first maximum operation time, the operation planning device 6d calculates and sets a second target maximum operation time such that the operation time of the fuel cell unit 1a in the first specified period does not exceed the first maximum operation time. Note that the second target maximum operation time is an upper limit of a target operation time of the fuel cell unit 1a in a second specified period (one day, for example) which is shorter than the first specified period.

The guaranteed operation period of the fuel cell unit 1a and the operation time life of the fuel cell unit 1a do not have to be considered when setting the first maximum operation time of the first specified period. However, by considering these, it is possible to reduce the possibility that the operation time reaches the operation time life before the guaranteed operation period lapses, and at the same time, the shortening of the device life can be suppressed.

The controller 6 operates the fuel cell unit 1a such that the operation time of the fuel cell unit 1a in the second specified period does not exceed the second target maximum operation time in principle. Specifically, for example, the controller 6 sets one start-up time and one stop time of the fuel cell unit 1a such that the operation time of the fuel cell unit 1a in the second specified period does not exceed the second target maximum operation time. To be specific, a time period from the start-up time until the stop time is a planned operation time, and the planned operation time may be set so as not to exceed the second target maximum operation time. At this time, for example, the start-up time and the stop time in the second specified period may be set such that a below-described energy cost reduction amount is maximum and the time period from the start-up time until the stop time is the second target maximum operation time. Modification Examples described below may be suitably referred for a specific method for determining the start-up time and the stop time.

As one example, the guaranteed operation period (product life) is 10 years, the operation time life (endurance time) is 40,000 hours, the first specified period is one week, and the second specified period is one day. At this time, for example, the first maximum operation time may be set to 76.7 hours/ week obtained on the basis that 10 years is 521.4 weeks, and 40,000 hours is divided by 521.4 weeks. In addition, the second target maximum operation time may be set to, for example, a predetermined time ranging from 7.7 hours to 20 hours. In consideration of the efficiency, it is preferable that the second target maximum operation time be set to a certain lower limit (7.7 hours, for example) or longer.

The first maximum operation time may be stored in a storage portion, not shown, of the controller 6 by the input of an operator or may be automatically calculated by the controller 6. Specifically, for example, the controller 6 may automatically calculate the first maximum operation time based on the guaranteed operation period, the operation time life, and the first specified period. However, parameters used for the calculation of the first maximum operation time are not especially limited, and the other parameters may be used.

The guaranteed operation period, the operation time life, and the first specified period may be stored in the storage portion, not shown, of the controller 6 by, for example, the input of the operator. The first maximum operation time can be calculated by, for example, Formula (1) below.

First Maximum Operation Time=Operation Time Life/(Guaranteed Operation Period/First Specified Period) (1)

The second target maximum operation time can be automatically calculated by the controller 6 based on the set first maximum operation time.

Table 1 shows one example of the second target maximum operation time set by the controller 6 in a case where the first specified period is one week, the second specified period is one day, and the first maximum operation time is 76.7 hours.

TABLE 1

| | Second Predetermined Period | | | | | | |
|---|---|---|---|---|---|---|---|
| | Sunday | Monday | Tuesday | Wednesday | Thursday | Friday | Saturday |
| Second Target Maximum Operation Time | 16 h | 10 h | 9 h | 11 h | 9 h | 7.7 h | 14 h |

In the example of Table 1, the first specified period is divided into a plurality of second specified periods, and the second target maximum operation time in each of the second specified periods is set such that the total of the second target maximum operation times of all the second specified periods in the same first specified period is equal to or shorter than the first maximum operation time of the first specified period. The second specified period in Table 1 is one day, that is, 24 hours from 0 a.m. (midnight) to 0 a.m. (midnight) of the next day. However, the present invention is not limited to this.

The controller 6 starts up and stops the fuel cell unit 1a. Here, the controller 6 starts up and stops the fuel cell unit 1a such that the operation time of the fuel cell unit 1a in the second specified period is the second target maximum operation time in principle. However, the fuel cell unit 1a may stop and restart by, for example, the operator. For example, the operation time of the fuel cell unit 1a may exceed the second target maximum operation time in a case where the amount of hot water stored in the hot water storage unit 1b is small, but the increase in the consumption amount of hot water is predicted due to, for example, a bath time, and the amount of hot water may not be enough. In contrast, in a case where a large amount of hot water is stored in the hot water storage unit 1b, and the amount of hot water may be enough even in consideration of the predicted consumption amount of hot water within several hours, the operation of the fuel cell unit 1a may stop before the operation time thereof reaches the second target maximum operation time. As above, the second target maximum operation time of the present embodiment is just a target, and the actual operation is not strictly limited to this.

It is preferable that the controller 6 limit the number of times of start-up and stop in the second specified period to smaller than a predetermined number of times (smaller than three times, that is, twice or smaller). With this, the shortening of the device life due to excessive repetition of the start-up and stop can be more surely suppressed.

As above, by associating the setting of the maximum operation time with the limitation of the number of times of start-up and stop, it is possible to more surely realize both the reduction of the possibility that the operation time reaches the operation time life before the guaranteed operation period lapses and the suppression of the shortening of the device life.

The first specified period is a period including a plurality of second specified periods. For example, in the above example, the first specified period consists of n second specified periods, and n is seven. A plurality of second specified periods may be the same as each other (for example, each period is one day) or may be different from each other (for example, the first one of the second specified periods is two days, and the second one of the second specified periods is one day). The total of the second specified periods included in the first specified period may be shorter than the first specified period. In this case, there is a surplus time. However, needless to say, the effects of the present embodiment can be obtained even in this case It is more preferable that the number of times of start-up and stop in the second specified period be limited to once. To be specific, it is preferable that the controller 6 start up the fuel cell unit 1a once and stop the fuel cell unit 1a once such that the operation time of the fuel cell unit 1a in the second specified period does not exceed the second target maximum operation time. The fuel cell unit 1a may surely stop or may not stop at a point between one second specified period and the next second specified period. In the latter case, the operation of the fuel cell unit 1a may continue in a plurality of second specified periods, so that the flexibility of the operation plan further increases. Moreover, for example, the second target maximum operation time in a certain second specified period may be allowed to be set to 24 hours. In this case, the operation of the fuel cell 1a continues from before the start of this certain second specified period until after the end of this certain second specified period.

Based on a time for which the fuel cell unit 1a has actually operated in the past second specified period included in a certain first specified period, the controller 6 reconfigures the second target maximum operation time of the future second specified period included in the certain first specified period. Hereinafter, a method for reconfiguring the second target maximum operation time in the present embodiment will be explained.

The following will describe as a first case a case where the operation time in a certain second specified period included in a certain first specified period is shorter than the second target maximum operation time. The following will explain a case where in the above example, for example, although the second target maximum operation time of the first one (Sunday) of the second specified periods of a certain week is 16 hours, the operation time on Sunday is actually 14 hours. Such a case may be a case where, for example, since the amount of hot water used on the previous day (Saturday) is small, the hot water remains, so that the hot water demand on Sunday can be satisfied without generating a large amount of hot water. In this case, the actual operation time (time for which the fuel cell unit 1a has been actually operated) is shown in Table 2.

TABLE 2

| | Second Predetermined Period | | | | | | |
|---|---|---|---|---|---|---|---|
| | Sunday | Monday | Tuesday | Wednesday | Thursday | Friday | Saturday |
| Actual Operation Time | 14 h | — | — | — | — | — | — |

The second target maximum operation time is 16 hours, but the actual operation time was 14 hours. This means that since the first maximum operation time in one week does not change, two hours is obtained as an extra time for the operation time in the week. The controller 6 optimally calculates and determines how to assign the remaining two hours to the remaining days. Thus, the controller 6 reconfigures the second target maximum operation times of respective days. An example of the result of the reconfiguring is shown in Table 3.

TABLE 3

| | Second Predetermined Period | | | | | | |
| --- | --- | --- | --- | --- | --- | --- | --- |
| | Sunday | Monday | Tuesday | Wednesday | Thursday | Friday | Saturday |
| Second Target Maximum Operation Time | — | 10 h | 9 h | 11 h | <u>11 h</u> | 7.7 h | 14 h |

In the example of Table 3, the remaining two hours is assigned to Thursday, so that the second target maximum operation time of Thursday is changed from 9 hours to 11 hours.

The following will describe as a second case a case where the operation time in a certain second specified period included in a certain first specified period is longer than the second target maximum operation time. The following will explain a case where in the above example, for example, although the second target maximum operation time of the second one (Monday) of the second specified periods of a certain week is 10 hours, the operation time on Monday is actually 14 hours. Such a case may be a case where, for example, since the amount of hot water used on the previous day (Sunday) is large, the hot water does not remain on Monday, so that the hot water demand on Monday cannot be satisfied if a larger amount of hot water than usual is not generated. In this case, the actual operation time (time for which the fuel cell unit 1a has been actually operated) is shown in Table 4.

TABLE 4

| | Second Predetermined Period | | | | | | |
| --- | --- | --- | --- | --- | --- | --- | --- |
| | Sunday | Monday | Tuesday | Wednesday | Thursday | Friday | Saturday |
| Actual Operation Time | 16 h | 14 h | — | — | — | — | — |

The second target maximum operation time is 10 hours, but the actual operation time is 14 hours. This means that since the first maximum operation time in one week does not change, four hours lacks for the operation time in the week. The controller 6 optimally calculates and determines how to obtain the lacking four hours from the second target maximum operation times of the other days. Thus, the controller 6 reconfigures the second target maximum operation times of respective days. An example of the result of the reconfiguring is shown in Table 5.

TABLE 5

| | Second Predetermined Period | | | | | | |
| --- | --- | --- | --- | --- | --- | --- | --- |
| | Sunday | Monday | Tuesday | Wednesday | Thursday | Friday | Saturday |
| Second Target Maximum Operation Time | — | — | 9 h | 11 h | 9 h | 7.7 h | <u>10 h</u> |

In the example of Table 5, the lacking four hours is obtained from Saturday, and the second target maximum operation time on Saturday is changed from 14 hours to 10 hours.

In the above example, the reconfiguring of the second target maximum operation time is carried out after each second specified period. However, the reconfiguring may be carried out at the other timing. For example, the reconfiguring may be carried out only on every Wednesday noon, or may be carried out at noon every day based on the actual operation times of the days before the day of the reconfiguring.

A specific method for the reconfiguring is not especially limited, and any method may be used as long as it reconfigures the second target maximum operation time of the future second specified period in the first specified period based on the time for which the fuel cell unit $1a$ has been actually operated in the past second specified period in the first specified period.

In accordance with this configuration, the energy supply system which creates the operation plan can optimize the operation plan based on the actual operation situation.

In the present embodiment, the operation time does not exceed the first maximum operation time of the first specified period. Therefore, it is preferable that the reconfiguring be carried out such that the total of the actual operation times of the past second specified periods in the first specified period and the second target maximum operation times of the future second specified periods in the first specified period is equal to the first maximum operation time.

When the controller 6 sets the first maximum operation time and/or the second target maximum operation time or reconfigures the second target maximum operation time, the controller 6 can consider various factors, such as the prediction of the load demand and the energy cost reduction amount.

It is preferable that the reconfiguring be carried out such that the energy cost reduction amount is maximum. Hereinafter, methods for setting and reconfiguring the maximum operation time in the case of maximizing the energy cost reduction amount will be explained.

First, it is assumed that the following conditions are set. Here, "Power generation efficiency of fuel cell" denotes a ratio of the energy (calorie) of the electric power obtained by power generation to the energy (calorie) of the gas supplied to the fuel cell. In addition, "Hot water supply efficiency of fuel cell" denotes a ratio of the energy (calorie) of the hot water obtained by power generation as by-product to the energy (calorie) of the gas supplied to the fuel cell.

Gas Rate: A [Japanese yen/kWh]
Electricity Rate: B [Japanese yen/kWh]
Calorie of Hot Water Consumed at Home: C [kWh]
Power Generation Efficiency of Fuel Cell: $\alpha$
Hot Water Supply Efficiency of Fuel Cell: $\beta$
Efficiency of Conventional Hot-water Supply Device: $\gamma$ The amount of gas consumed in the fuel cell to supply the hot water of the calorie C (calorie which is obtained from the temperature difference between the hot water and the city water [tap water] and the volumes of the hot water or the city water [tap water] and is necessary for the hot water supply) is $C/\beta$ [kWh]. The gas rate is $A \times C/\beta$ [Japanese yen]. At this time, the fuel cell generates the electric power in accordance with the amount of gas consumed. The generated electric power amount is $\alpha \times C/\beta$ [kWh]. Therefore, in the case of the energy supply system 1 of the present embodiment, the hot water of the calorie C [kWh] and the electric power of $\alpha \times C/\beta$ [kWh] are obtained by the cost of $A \times C/\beta$ [Japanese yen].

Meanwhile, the following will describe a case where as before, the hot water is generated by a gas hot-water supply device, and the electric power is purchased from an electric power system. A cost of generating the hot water is $A \times C/\gamma$ [Japanese yen], and a purchase cost of the electric power is $B \times \alpha \times C/\beta$ [Japanese yen]. The total cost is $A \times C/\gamma + B \times \alpha \times C/\beta$ [Japanese yen].

Assuming that the amount of hot water generated is the same, and the electric power generated by the fuel cell is entirely consumed at home, the energy cost reduction amount in the case of utilizing the energy supply system 1 can be obtained by Formula (2) below.

$$\text{Energy Cost Reduction Amount} = ([\text{Conventional Cost}] - [\text{Cost of Energy Supply System 1}]) = (A \times C/\gamma + B \times \alpha \times C/\beta - A \times C/\beta) \quad (2)$$

The above calculation method is just one example. Needless to say, the energy cost reduction amount may be calculated using the other method.

For example, the controller 6 may store time-lapse changes (for example, changes due to time periods and days of a week) of each of the electric power consumption amount and the hot water consumption amount at home for which the energy supply system 1 is actually provided, and may predict the time period and day of a week requiring the electric power and hot water and a required electric power amount and required hot water amount based on the stored time-lapse changes. For example, based on the time-lapse changes of each of the electric power consumption amount and the hot water consumption amount in the past 10 weeks (10 times the first specified period), the controller 6 predicts the electric power consumption and hot water consumption amount in each day of the next week (each of the second specified periods included in the first specified period) and the electric power consumption amount and hot water consumption amount in each time period. Based on the result of the prediction, the second target maximum operation time of each day is calculated and determined such that, for example, the total of the second target maximum operation times in the first specified period does not exceed the first maximum operation time, and the energy cost reduction amount per unit time (for example, per first specified period) is maximum. Based on the result of the calculation, the second target maximum operation time of each day is set or reconfigured.

The controller 6 may change the number of second specified periods in one first specified period in accordance with a predetermined pattern. One example of the predetermined pattern is that if the period (years) of use of the fuel cell system is short, the number of second specified periods in one first specified period is set to be large, and the number of second specified periods in one first specified period is reduced as the period of use becomes long. Moreover, the number of second specified periods in one first specified period may be changed in accordance with an environmental condition. The environmental condition may be at least one of calendar information, season information, an outside air temperature, and a city water temperature. Further, the number of second specified periods in one first specified period may be a fixed constant value (constant). It is preferable that in the above case, the second specified periods in the first specified period be the same values as one another and the fixed constant values. In this case, as the number of second specified periods in the first specified period increases, the first specified period becomes long.

It is preferable that the first specified period be one year or shorter. It is preferable that the second specified period be one month or shorter. By setting the specified periods as above, the operation plan can be set more appropriately.

The first maximum operation time and/or the second target maximum operation time may be a constant value. However, the controller 6 may change the first maximum operation time and/or the second target maximum operation time in accordance with the environmental condition. The environmental condition may be at least one of the calendar information, the season information, the outside air temperature, and the city water temperature.

One example of a control operation based on the calendar information is that in a case where the amount of hot water consumed is larger on a weekday than on a holiday, the second target maximum operation times of the weekdays are shortened, and the second target maximum operation times of the holidays are lengthened.

One example of the control operation based on the season information is that in a case where the amount of hot water consumed is larger in winter than in summer, the first maximum operation times in a summer season (June to September) are shortened, and the first maximum operation times in a winter season (December to March) are lengthened.

One example of the control operation based on the outside air temperature or the city water temperature is that in a case where the amount of hot water consumed is large on a day on which the outside air temperature or the city water temperature is lower than a predetermined threshold temperature, the second target maximum operation time on a day on which the outside air temperature or the city water temperature is equal to or higher than the predetermined threshold temperature is shortened, and the second target maximum operation time on a day on which the outside air temperature or the city water temperature is lower than the predetermined threshold temperature is lengthened.

The controller may change the first specified period and the second specified period in accordance with a predetermined pattern. For example, the first specified period and the second specified period may be shortened as an integrated use period becomes long.

A remote controller 7 (see FIG. 8, for example) may be included, which is configured to input the start-up time and stop time of the fuel cell unit 1a. Here, the controller 6 may be configured to set the start-up time and stop time input via the remote controller 7 as a device start-up time and device stop time that are the start-up time and stop time of the fuel cell unit 1a in a case where the time period from the start-up time until the stop time input via the remote controller 7 does not exceed the second target maximum operation time. Moreover, the controller 6 may be configured so as not to set the start-up time and stop time input via the remote controller 7 as the device start-up time and device stop time in a case where the time period from the start-up time until the stop time input via the remote controller 7 exceeds the second target maximum operation time.

The controller 6 starts up the fuel cell unit 1a at the device start-up time and stops the fuel cell unit 1a at the device stop time.

An informing device may be included, which is configured to inform that the time period (planned operation time) from the start-up time until the stop time input via the remote controller 7 exceeds the second target maximum operation time in a case where the planned operation time exceeds the second target maximum operation time. The informing device may be formed integrally with the remote controller 7 and be configured to display an informing message on a screen.

The controller 6 may update the first maximum operation time based on an integrated operation time of the fuel cell unit 1a. In this case, as one example, the controller 6 includes a calendar circuit (not shown) configured to give time and a memory (not shown). Based on the start-up time and stop time obtained using the calendar circuit (for example, a below-described real time counter), the controller 6 calculates the actual operation time that is a time in which the fuel cell unit 1a actually operates. The controller 6 adds the actual operation time to the integrated operation time stored in the memory and stores the obtained sum in the memory as the integrated operation time again. Thus, the controller 6 can add up the integrated operation time.

In a case where the efficiency excessively deteriorates since the time period from the actually set start-up time until the actually set stop time is shorter than the second target maximum operation time, or the operation is forcibly terminated by the operator, or the generated electric power is not consumed at home for a long time, the operation of the fuel cell unit 1a may stop at the time of the termination of a certain first specified period before the operation time reaches the first maximum operation time of the first specified period. In such a case, the fuel cell unit 1a is operated only for a time shorter than a planned time. Therefore, even if the operation is carried out for the remaining time in the future according to need, the possibility that the operation time reaches the operation time life before the guaranteed operation period lapses may not become high. Therefore, in a case where the actual operation time is shorter than the planned time, the remaining time is "saved" and used for the future operation, which is advantageous.

Here, in a case where the first specified period lapses, and the actual operation time of the fuel cell unit 1a in the first specified period is shorter than the second target maximum operation time, the controller 6 may calculate and integrate a difference between the first maximum operation time and the actual operation time, and store resulting data as an integrated surplus operation time.

The guaranteed operation period and the operation time life are not changed unless the circumstances are exceptional. If the integrated surplus operation time increases, the operation time of the fuel cell unit 1a is unlikely to reach the operation time life before the guaranteed operation period lapses even if the fuel cell unit 1a is operated for more than the original maximum operation time. Here, it is preferable that in a case where the integrated surplus operation time is accumulated to some extent, the first maximum operation time be increased to increase the degree of freedom of the operation of the energy supply system 1. Specifically, for example, the controller 6 may be configured to update the first maximum operation time in a case where the integrated surplus operation time reaches a preset third specified period (100 hours, for example). In the update, a time period from the time of the update to the end of the guarantee period at the time of sale is set as a new guaranteed operation period, and the integrated surplus operation time is set as the operation time life. By substituting these to Formula (1) above, the first maximum operation time can be obtained again.

As in the below-described embodiments and modification examples, in a case where a predetermined condition is satisfied, the operation time may not be limited to the maximum operation time (the first maximum operation time and/or the second target maximum operation time may not be set).

Modification Example

Next, one example of the operation of the controller 6 of the fuel cell cogeneration system 1 based on the predicted heat load demand and the predicted electric power load demand described above will be explained in reference to the drawings.

Figure 2:
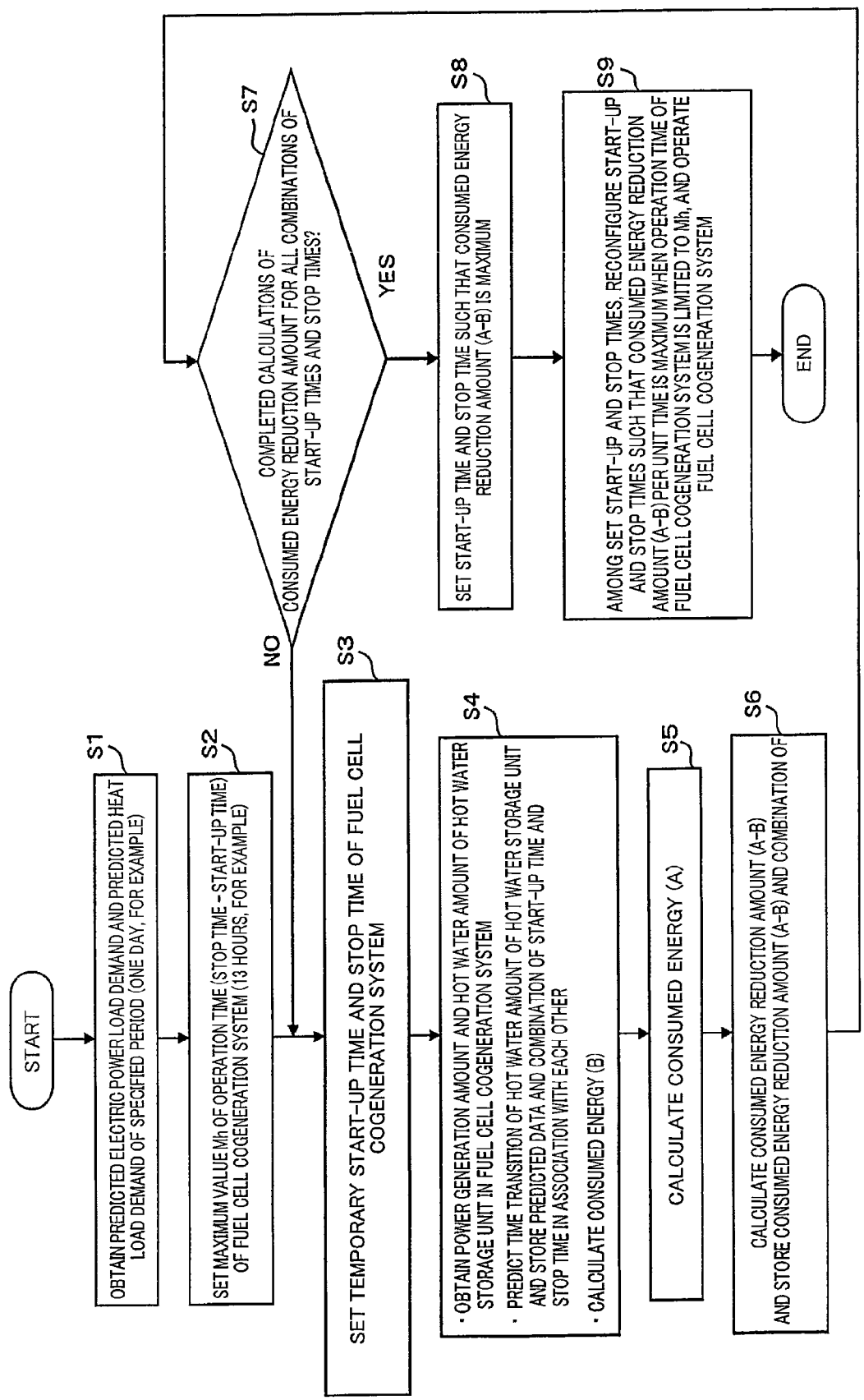
FIG. 2 is a flow chart showing an operation example of the cogeneration system according to Embodiment 1.

FIG. 2 is a flow chart showing an operation example of the cogeneration system according to the present embodiment.

First, the operation planning device 6c of the controller 6 obtains the predicted electric power load demand and predicted heat load demand of the specified period (one day, for example), the demands being stored in the memory 6a (Step S1).

Each of the predicted electric power load demand and the predicted heat load demand may be a predicted demand based on the electric power consumption history of the typical electric power load and the heat consumption history of the typical heat load, the histories being prestored in the memory 6a when providing the fuel cell cogeneration system 1 at home, or may be a predicted demand based on the electric power consumption history of the electric power load and the heat consumption history of the heat load, the histories being changed by the demand predictor 6b in accordance with the progress of the operation of the fuel cell cogeneration system 1 so as to adapt to a life cycle of each home.

Next, the maximum operation time setting device 6d sets a maximum operation time Mh of the fuel cell cogeneration system 1 in the specified period (one day, for example) (Step S2), and then sets one of multiple combinations of the start-up time and stop time of the fuel cell cogeneration system 1 as a temporary start-up time and stop time (Step S3).

Next, based on the start-up time and stop time of the fuel cell cogeneration system 1 temporarily set in Step S3 and the predicted electric power load demand and predicted heat load demand of the specified period (one day, for example) obtained from the memory 6a, the operation planning device 6c calculates the total of the generated electric power amount generated by the fuel cell cogeneration system 1 and the calorie (the amount of hot water corresponding to this calorie; hereinafter referred to as "hot water storage unit hot water supply amount") supplied to the hot water storage unit 1b during the operation period of a case where the cogeneration system is assumed to be operated between the temporarily set start-up time and stop time. In addition, the operation planning device 6c stores in the memory 6a a time transition of the hot water storage unit hot water supply amount predicted in the above calculation. Then, based on the predicted heat load demand obtained from the memory 6a and predict data of the time transition of the hot water storage unit hot water supply amount, the time transition of the amount of hot water stored in the hot water storage unit 1b of the fuel cell cogeneration system 1 (hereinafter referred to as "hot water storage unit hot water amount") is predicted on the condition that the hot water is supplied to the heat load to cover the predicted heat load demand as long as a hot water storage tank stores the hot water. The predict data is associated with the combination of the temporarily set start-up time and stop time and stored in the memory 6a. Then, the operation planning device 6c calculates a consumed energy (B) of the fuel cell cogeneration system 1, the consumed energy (B) being necessary for generating the total of the generated electric power amount and the hot water storage unit hot water supply amount during the operation period (Step S4).

The consumed energy (B) is an indication of the consumed energy reduction at home when introducing the fuel cell cogeneration system 1 to home. The consumed energy (B) denotes a raw material energy (total energy of a material gas consumed by the operation of the fuel cell cogeneration system 1, the electric power for the operation of the fuel cell cogeneration system 1, and the like) necessary for the operation of the fuel cell cogeneration system 1 when generating the generated electric power amount and the hot water storage unit hot water supply amount.

Next, the operation planning device 6c calculates a consumed energy (A) using the generated electric power amount and hot water storage unit hot water supply amount of the fuel cell cogeneration system 1 during the temporarily set operation period (between the start-up time and the stop time) predicted by the operation planning device 6c in Step S3 (Step S5).

The consumed energy (A) is a standard of the consumed energy reduction amount at home when introducing the fuel cell cogeneration system 1 to home. The consumed energy (A) is the total energy in a case where it is assumed that the generated electric power amount and hot water storage unit hot water supply amount of the fuel cell cogeneration system 1 predicted by the operation planning device 6c are entirely covered by not the fuel cell cogeneration system 1 but the electric power and gas supplied from existing infrastructures, such as electric power companies and gas companies.

Next, the operation planning device 6c subtracts the consumed energy (B) of Step S3 from the consumed energy (A) of Step S5 to obtain a value (A−B). The value (A−B) is regarded as the consumed energy reduction amount of the fuel cell cogeneration system 1. The value (A−B) is associated with the combination of the start-up time and stop time temporarily set in Step S3 and stored in the memory 6a (Step S6).

Here, the operation planning device 6c determines whether or not the calculations of the consumed energy reduction amount (A−B) for all the combinations of the start-up time and stop time are finished (Step S7). If all the calculations of the consumed energy reduction amount (A−B) are not finished ("No" in Step S7), Steps S3, S4, S5, and S6 are repeated. If all the calculations of the consumed energy reduction amount (A−B) are finished ("Yes" in Step S7), the process proceeds to the next step.

Further, the operation planning device 6c reads out from the memory 6a and sets the combination of the start-up time and stop time by which the consumed energy reduction amount (A−B) is maximum, among the plurality of combinations of the start-up time and stop time stored in the memory 6 in Step S6 (Step S8).

After that, among the start-up and stop times of the fuel cell cogeneration system 1 set in Step S8, the operation planning device 6c reconfigures the start-up and stop times by which the consumed energy reduction amount (A−B) per operation unit time is maximum when the operation time of the fuel cell cogeneration system is limited to Mh, and the fuel cell cogeneration system 1 is then operated (Step S9).

Figure 3:
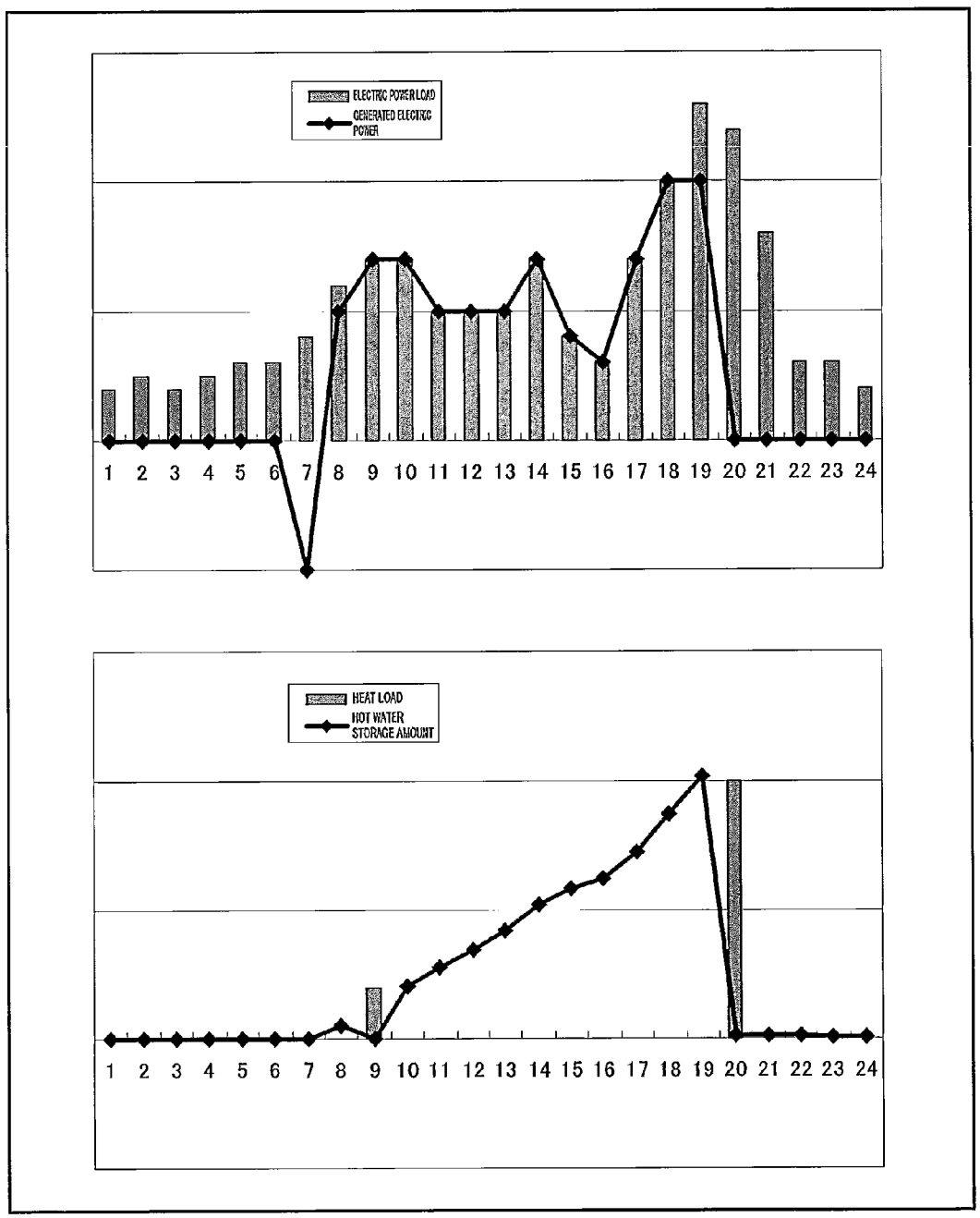
FIG. 3 is a diagram showing one example of an operation history of the cogeneration system according to Embodiment 1.

FIG. 3 shows one example of the generated electric power history with respect to one example of the electric power load and one example of the hot water storage unit hot water amount history with respect to one example of the heat load in a case where the fuel cell cogeneration system of the present embodiment is operated.

In FIG. 3, a horizontal axis of each graph denotes time (1 to 24 o'clock), a vertical axis of an upper graph denotes the electric power, and a vertical axis of a lower graph denotes the hot water amount.

The fuel cell cogeneration system of the present embodiment requires an hour from the start-up until the start of the electric power generation, and consumes the constant start-up energy (500 W, for example) from the start-up until the start of the electric power generation.

In this example, the maximum operation time Mh of the fuel cell cogeneration system 1 in the specified period (one day, for example) in Step S2 of the flow chart of FIG. 2 is set to 13 hours. As a result, in Step S8, the start-up time is 4 o'clock, the stop time is 21 o'clock, and the operation time is 17 hours.

In order to carry out the operation for 13 hours between 4 o'clock and 21 o'clock, the start-up time is limited to between 4 o'clock and 8 o'clock, and the stop time is also limited to between 17 o'clock and 21 o'clock in accordance with the start-up time. In this example, in the case of reconfiguring the start-up time in Step S9 of the flow chart of FIG. 2 such that the consumed energy reduction amount (A−B) per operation unit time is maximum, the consumed energy reduction amount (A−B) per operation unit time is maximum when the start-up time is 7 o'clock.

In FIG. 3, the fuel cell cogeneration system of the present embodiment starts up at 7 o'clock. At 7 o'clock, the fuel cell cogeneration system just consumes the start-up energy, and the generated electric power is negative.

Moreover, as shown in FIG. 3, the fuel cell cogeneration system of the present embodiment stops at 20 o'clock, and the time from the start-up until the stop is 13 hours.

Here, as shown in the lower graph of FIG. 3, the amount of hot water in the hot water storage unit at 20 o'clock is zero by a large hot water load at 20 o'clock. This indicates that the operation of the fuel cell cogeneration system is efficiently carried out.

Moreover, the generated electric power amount per operation unit time of the fuel cell cogeneration system at this time is about 583 Wh.

Figure 4:
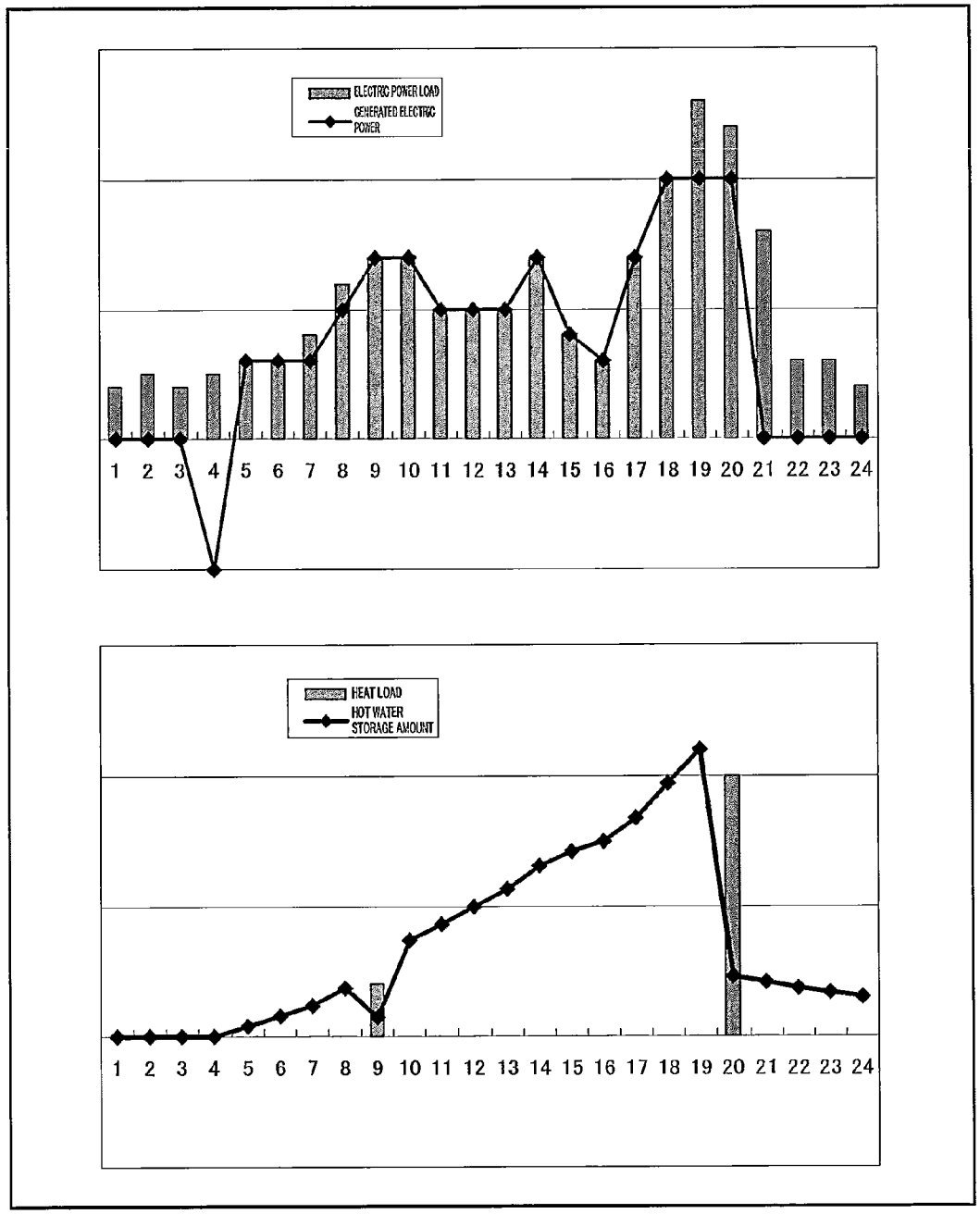
FIG. 4 is a diagram showing one example of the operation history of the cogeneration system according to the prior art.

For comparison, FIG. 4 shows the generated electric power history with respect to the same electric power load as in FIG. 3 and the hot water storage unit hot water amount history with respect to the same heat load as in FIG. 3 in a case where the fuel cell cogeneration system of the prior art is operated.

In FIG. 4, a horizontal axis of each graph denotes time (1 to 24 o'clock), a vertical axis of an upper graph denotes the electric power, and a vertical axis of a lower graph denotes the hot water amount.

As with the fuel cell cogeneration system of the present embodiment, the fuel cell cogeneration system of the prior art requires an hour from the start-up until the start of the electric power generation, and consumes the constant start-up energy (500 W, for example) from the start-up until the start of the electric power generation.

The fuel cell cogeneration system of the prior art which does not limit the operation time starts up at 4 o'clock. At 4 o'clock, the fuel cell cogeneration system of the prior art consumes the start-up energy, and the generated electric power is negative.

After that, the fuel cell cogeneration system of the prior art generates the electric power for 16 hours from 5 o'clock until 21 o'clock. As a result, the hot water remains in the hot water storage unit at 21 o'clock at which the system stops.

Moreover, the generated electric power amount per operation unit time of the fuel cell cogeneration system at this time is about 556 Wh.

As above, the fuel cell cogeneration system of the present embodiment shown in FIG. 3 is shorter in operation time than the fuel cell cogeneration system of the prior art shown in FIG. 4 but is larger in the generated electric power amount per operation unit time than the fuel cell cogeneration system of the prior art shown in FIG. 4.

Needless to say, larger the generated electric power amount per operation unit time is, larger the consumed energy reduction amount per operation unit time becomes.

Therefore, in accordance with the fuel cell cogeneration system of the present embodiment, the maximum operation time setting device 6d sets the maximum operation time of the system, the operation planning device 6c sets the start-up time and stop time of the system within the maximum operation time, and the fuel cell cogeneration system operates. With this, the consumed energy reduction amount at the object for which the system is provided can be maintained at a high level while suppressing the operation time.

In the present embodiment, the maximum operation time is 13 hours. However, the optimal maximum operation time may change depending on the electric power load and heat load of the object for which the fuel cell cogeneration system is provided. Even if the different maximum operation time from the present embodiment is set, it is obviously within the scope of the present invention.

Moreover, the fuel cell cogeneration system has been explained as one example of the energy supply system. However, the same effects as above can be obtained even by an engine cogeneration system using an engine or a turbine power generating system configured to generate electric power by causing a turbine to rotate by a gas.

Modification Example 1

The present embodiment has explained one example of the operation plan of the fuel cell cogeneration system 1 in a case where the specified period whose predicted electric power load demand and predicted heat load demand are obtained in Step S1 of the flow chart shown in FIG. 2 is fixed to one day by the period setting device 6e.

However, the specified period whose predicted electric power load demand and predicted heat load demand are obtained may not be constant and may be changed in accordance with, for example, seasons.

Figure 5:
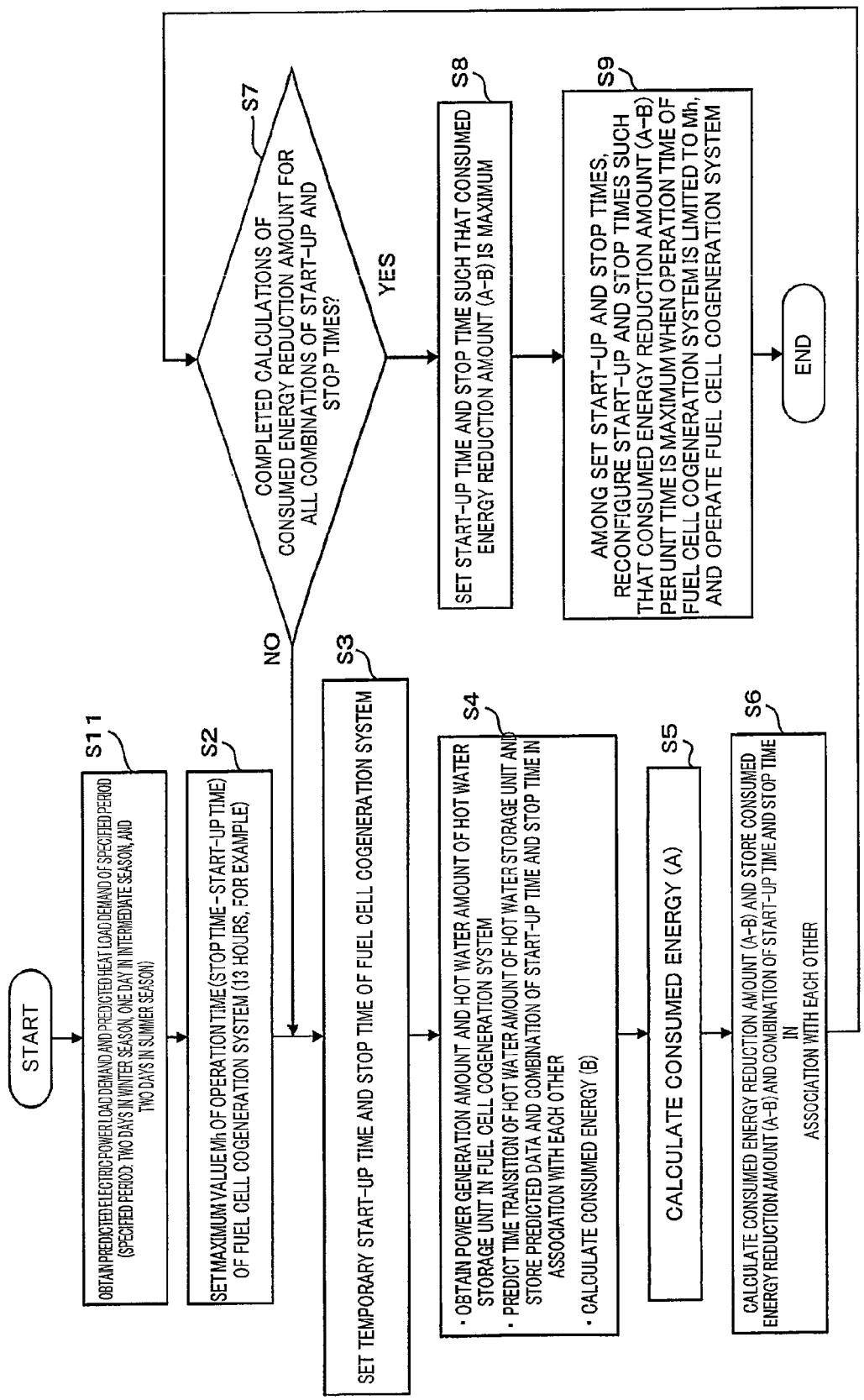
FIG. 5 is a flow chart showing an operation example of the cogeneration system according to Modification Example 1 of Embodiment 1.

In the flow chart of FIG. 5, Step 11 is carried out instead of Step S1 of the flow chart of FIG. 2.

The other steps of the flow chart of FIG. 5 are the same as those of the flow chart of FIG. 2, so that explanations thereof are omitted.

In Step S11, the specified period in an intermediate season (such as a spring season from March to May and an autumn season from September to November) is set to one day by the period setting device 6e, the predicted electric power load demand and predicted heat load demand of one day are obtained, and the start-up time and stop time of one day are set.

In the winter season (from December to February next year), the heat load tends to be large, so that the operation time of the fuel cell cogeneration system 1 generally tends to increase. In consideration of the consumed energy reduction amount (A−B), it may be desirable to operate the system all day. In such a case, for example, in the winter season, the specified period is set to two days by the period setting device 6e, the predicted electric power load demand and predicted heat load demand of two days are obtained, the operation plan for two days is calculated, and the start-up time and stop time of the fuel cell cogeneration system 1 are set.

In the summer season (from June to August), the heat load tends to be small, so that the operation time of the fuel cell cogeneration system 1 generally tends to be short. In consideration of the consumed energy reduction amount (A−B), it may be better not to start up the system by using the start-up energy. In such a case, for example, in the summer season, the specified period is set to two days by the period setting device 6e, the predicted electric power load demand and predicted heat load demand of two days are obtained, the operation plan for two days is calculated, and the start-up time and stop time of the fuel cell cogeneration system 1 are set.

With this, the start-up time and the stop time can be flexibly set in accordance with the change of the seasons.

Modification Example 2

The present embodiment has explained one example of the operation plan in which the maximum operation time Mh of the fuel cell cogeneration system 1 is set to a constant value by the maximum operation time setting device 6d in Step S2 of the flow chart shown in FIG. 2.

However, the maximum operation time Mh may not be set to the constant value and may be changed in accordance with, for example, seasons.

Figure 6:
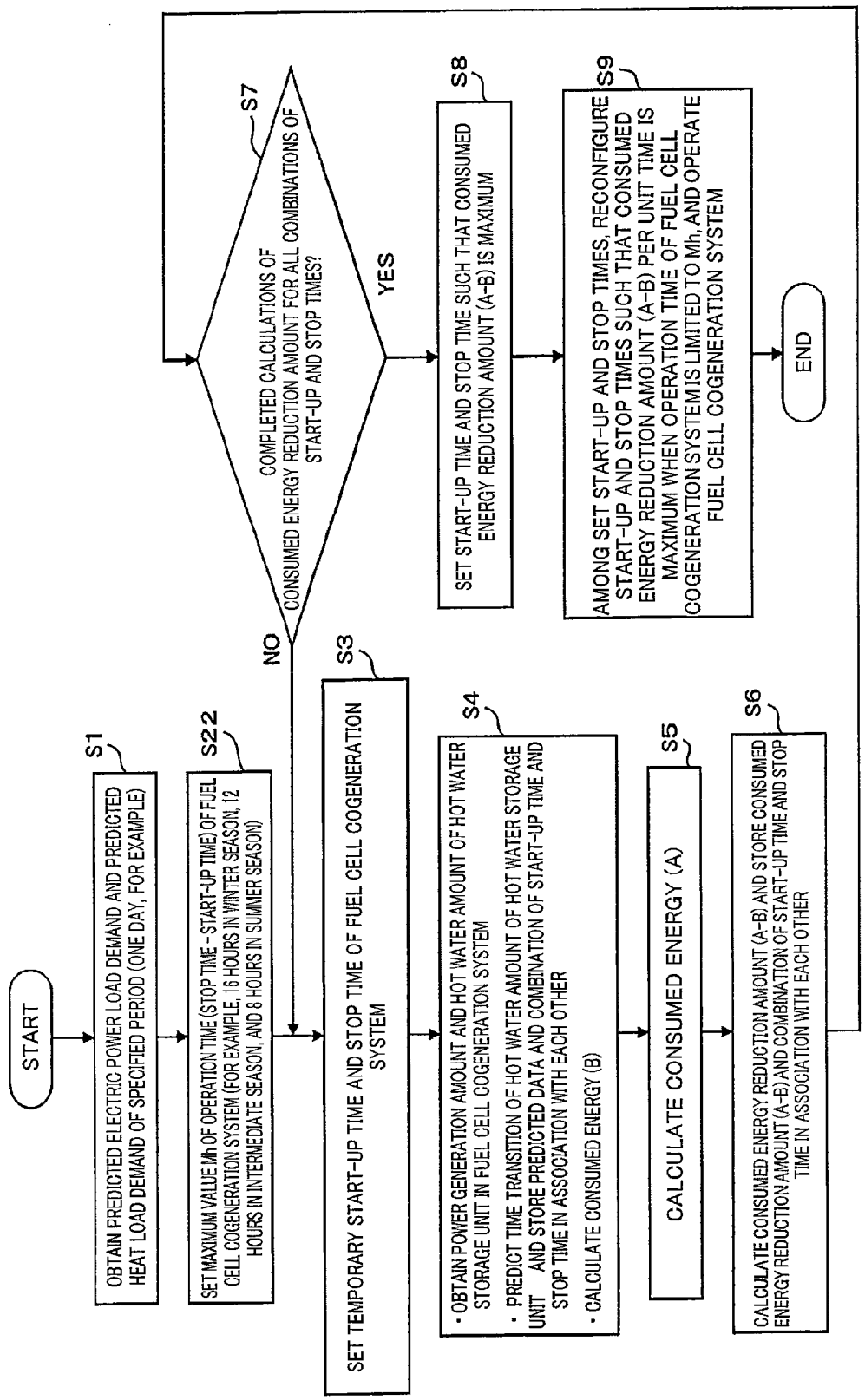
FIG. 6 is a flow chart showing an operation example of the cogeneration system according to Modification Example 2 of Embodiment 1.

In the flow chart of FIG. 6, Step 22 is carried out instead of Step S2 of the flow chart of FIG. 2.

The other steps of the flow chart of FIG. 6 are the same as those of the flow chart of FIG. 2, so that explanations thereof are omitted.

Generally, the heat load tends to be smaller in the intermediate season (such as the spring season from March to May or the autumn season from September to November) than in the winter season (from December to February next year), and the heat load tends to be smaller in the summer season (from June to August) than in the intermediate season (such as the spring season from March to May or the autumn season from September to November). Therefore, generally, the consumed energy reduction amount (A−B) in a case where the fuel cell cogeneration system 1 is operated becomes smaller in order of the winter season, the intermediate season, and the summer season.

Therefore, in order to obtain the larger consumed energy reduction amount (A−B) per year by the fuel cell cogeneration system 1, it is desirable that the operation time of the fuel cell cogeneration system 1 in the summer season be suppressed to be comparatively short whereas the operation time of the fuel cell cogeneration system 1 in the winter season be comparatively long.

In Step S22 of FIG. 6, the maximum operation time setting device 6d of the fuel cell cogeneration system 1 sets the maximum operation time Mh to 16 hours in the winter season, 12 hours in the intermediate season, and 8 hours in the summer season.

With this, the larger consumed energy reduction amount (A−B) per year can be obtained by the fuel cell cogeneration system 1.

Modification Example 3

The present embodiment has explained one example of the operation plan in which the start-up and stop times are reconfigured in Step S9 of the flow chart of FIG. 2 such that the consumed energy reduction amount (A−B) per operation unit time is maximum. However, the consumed energy (B) may be considered when reconfiguring the start-up and stop times.

Figure 7:
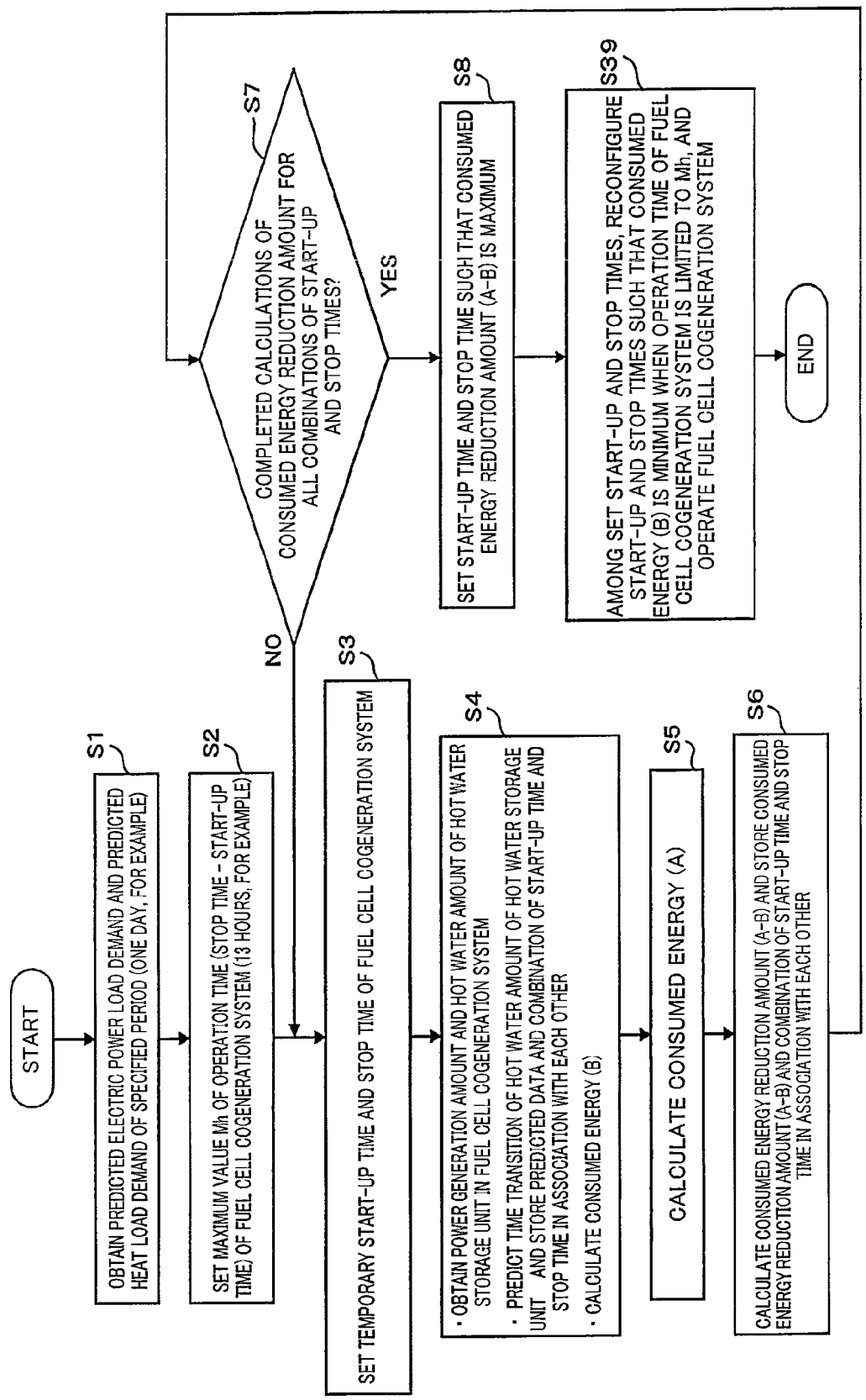
FIG. 7 is a flow chart showing an operation example of the cogeneration system according to Modification Example 3 of Embodiment 1.

In the flow chart of FIG. 7, Step S39 is carried out instead of Step S9 of the flow chart of FIG. 2.

The other steps of the flow chart of FIG. 7 are the same as those of the flow chart of FIG. 2, so that explanations thereof are omitted.

In Step S39, the start-up time and the stop time are reconfigured by the operation planning device 6c such that the consumed energy (B) is minimum when the maximum operation time of the fuel cell cogeneration system 1 is limited to Mh, and the fuel cell cogeneration system 1 is then operated.

At this time, on the ground that the start-up and stop times are already set in Step S8 such that the consumed energy reduction amount (A−B) is maximum, the start-up and stop times are simply reconfigured such that the consumed energy (B) is minimum. Even with this, the same effects as the present embodiment can be obtained.

(Embodiment 2)

Figure 8:
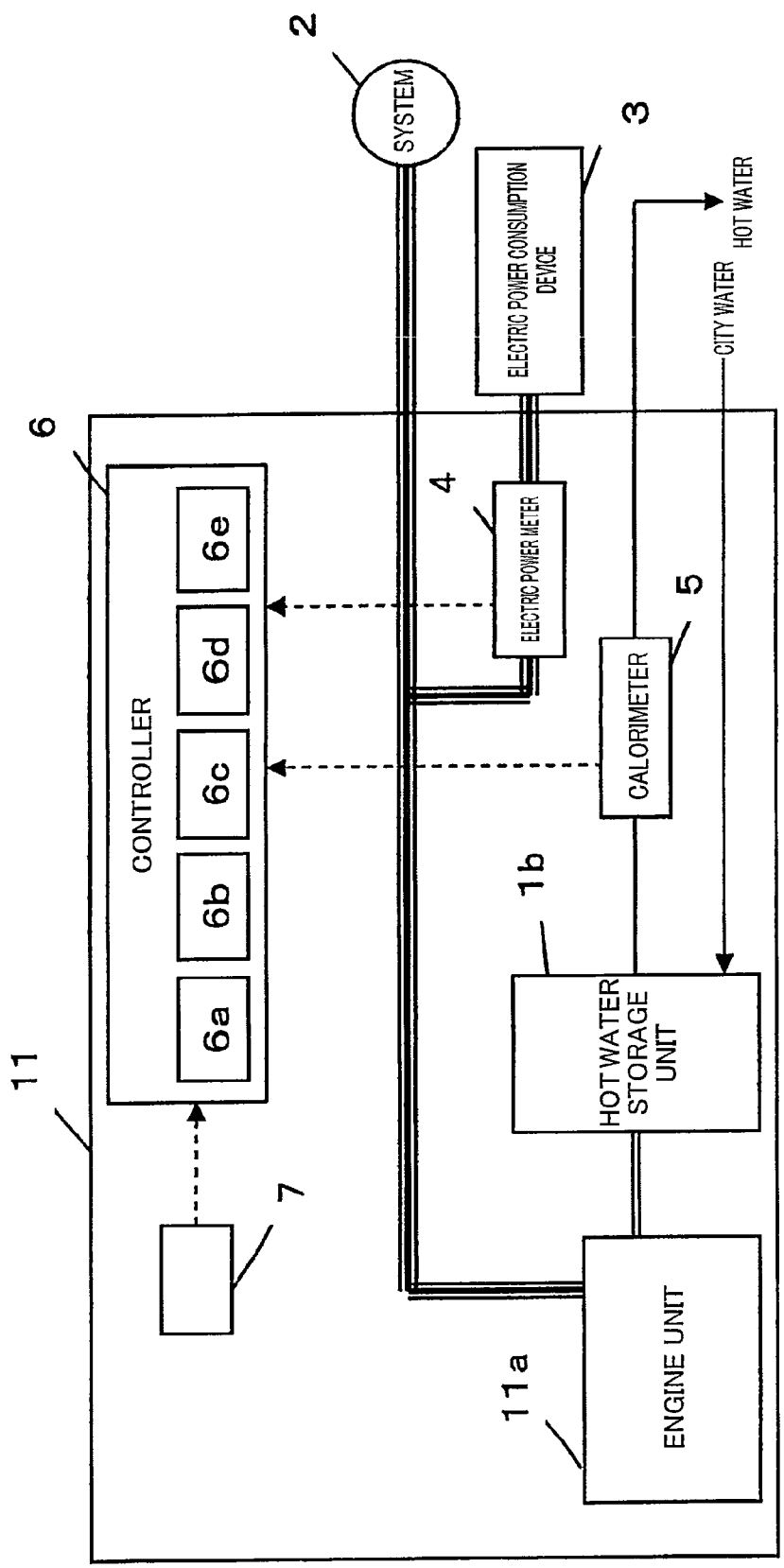
FIG. 8 is a block diagram showing a configuration example of the cogeneration system according to Embodiment 2.

FIG. 8 is a block diagram showing a configuration example of the cogeneration (heat-electric power supply) system according to Embodiment 2 of the present invention and shows an engine cogeneration system as one example of the cogeneration system.

An engine cogeneration system 11 according to the present embodiment shown in FIG. 8 includes an engine unit 11a instead of the fuel cell unit 1a of the fuel cell cogeneration system 1 according to Embodiment 1 shown in FIG. 1. The engine cogeneration system 11 further includes the remote controller 7 configured such that a user can arbitrarily set the start-up time and stop time of the engine cogeneration 11. The other components in the engine cogeneration system 11 are the same as those in FIG. 1, and the same reference signs as in FIG. 1 are used for the same components.

The cogeneration system 11 of the present embodiment includes the unit 11a configured to generate the electric power by an engine and the hot water storage unit 1b configured to increase the temperature of the city water by using the heat generated simultaneously with the electric power by the engine of the engine unit 11a and store the city water as the hot water. The electric power generated by the engine unit 11a is supplied to the electric power consumption device 3 together with the electric power supplied from the electric power system 2.

The amount of the electric power load consumed by the electric power consumption device 3 is measured by the electric power meter 4 and sequentially accumulated by the memory 6a of the controller 6.

Moreover, the hot water stored in the hot water storage unit 1b is supplied through a faucet or the like as the hot water. The amount of the heat load utilized as the hot water is measured by the calorimeter 5 and sequentially accumulated in the memory 6a of the controller 6.

For example, the calorimeter 5 includes a temperature sensor (not shown) configured to measure the temperature of the city water, a temperature sensor (not shown) configured to measure the temperature of the hot water supplied from the hot water storage unit 1b, and a flow meter (not shown) configured to measure the flow rate of the hot water supplied from the hot water storage unit 1b. The calorimeter 5 calculates the amount of the heat load utilized as the hot water by multiplying the temperature difference between the city water and the hot water by the flow rate of the hot water.

Moreover, the engine cogeneration system 11 includes a backup hot-water supply device (not shown) in order to supply the hot water even in a case where there is no hot water in the hot water storage unit 1b.

The remote controller 7 can set the start-up time and stop time of the engine cogeneration system 11 by the operation of the user. The set start-up time and stop time are stored in the memory 6a.

Further, the controller 6 includes the demand predictor 6b and the operation planning device 6c. The demand predictor 6b predicts the time series pattern of the future electric power load generation and future heat load generation from the electric power load generation history and the heat load generation history accumulated in the memory 6a. The operation planning device 6c sets the start-up time and stop time of the engine cogeneration system 1 to between the start-up time and stop time set by the remote controller 7 based on the predicted value of the time series pattern of the electric power load generation and heat load generation predicted by the demand predictor 6b.

The demand predictor 6b reads out the heat load generation history and electric power load generation history of the specified period (one year, for example), the histories being stored in the memory 6a. Based on the histories, the demand predictor 6b estimates and calculates the predicted demand of the electric power load which changes by time transition in the future specified period (one day, for example) and the predicted demand of the heat load which changes by time transition in the future specified period (one day, for example) (hereinafter, these demands are respectively abbreviated as "predicted electric power load demand" and "predicted heat load demand"). Then, the predicted electric power load demand and the predicted heat load demand are sequentially stored in the memory 6a.

It is desirable that an accumulated period of a heat consumption history of each of the past electric power load and past heat load necessary for estimating the predicted electric power load demand and the predicted heat load demand be a period in which the engine cogeneration system 1 of the present embodiment can appropriately recognize a consumption cycle of the electric power and heat at the object for which the system is provided. For example, in a case where the engine cogeneration system is provided at general home, the accumulated period is about several days to several months.

Figure 9:
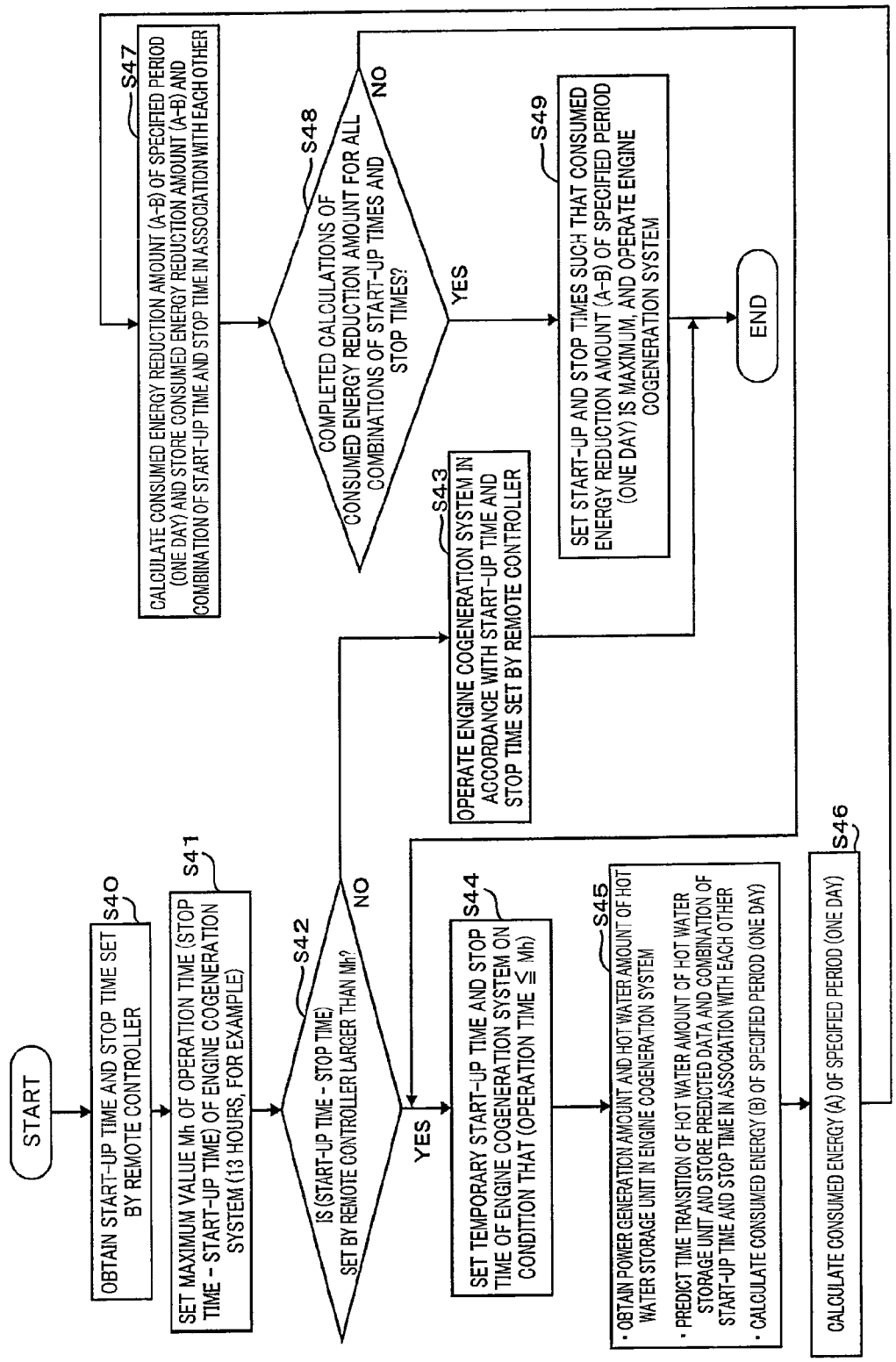
FIG. 9 is a flow chart showing an operation example of the cogeneration system according to Embodiment 2.

FIG. 9 is a flow chart showing the operation example of the cogeneration system according to Embodiment 2.

First, the operation planning device 6c of the controller 6 obtains the start-up time and stop time stored in the memory 6a and set by the remote controller 7 (Step S40).

Next, the maximum operation time setting device 6d sets the maximum operation time Mh of the engine cogeneration system 11 in the specified period (one day, for example) (Step S41), and then the operation planning device 6c compares the time period from the start-up time until the stop time obtained in Step 40 with the maximum operation time Mh (Step S42).

Here, in a case where the time period from the start-up time until the stop time is shorter than or equal to the maximum operation time, the engine cogeneration system is operated in accordance with the start-up time and stop time set by the remote controller 7 (Step S43).

In contrast, in a case where the time period from the start-up time until the stop time is longer than the maximum operation time, one of a plurality of combinations of the start-up time and the stop time by which the maximum operation time becomes equal to or shorter than Mh is set as temporary start-up time and stop time in the period from the start-up time until the stop time set by the remote controller (Step S44). Next, based on the start-up time and stop time of the engine cogeneration system 11 temporarily set in Step S44 and the predicted electric power load demand and predicted heat load demand of the specified period (one day, for example) obtained from the memory 6a, the operation planning device 6c calculates the total of the generated electric power amount generated by the engine cogeneration system 11 and the calorie (the amount of hot water corresponding to this calorie; hereinafter referred to as "hot water storage unit hot water supply amount") supplied to the hot water storage unit 1b by the cogeneration system 11 during the operation period of a case where the cogeneration system is assumed to be operated between the temporarily set start-up time and stop time. In addition, the operation planning device 6c stores in the memory 6a a time transition of the hot water storage unit hot water supply amount predicted in the above calculation. Then, based on the predicted heat load demand obtained from the memory 6a and predict data of the time transition of the hot water storage unit hot water supply amount, the time transition of the amount of hot water stored in the hot water storage unit 1b of the engine cogeneration system 11 (hereinafter referred to as "hot water storage unit hot water amount") is predicted on the condition that the hot water is supplied to the heat load to cover the predicted heat load demand as long as a hot water storage tank stores the hot water. The predict data is associated with the combination of the temporarily set start-up time and stop time and stored in the memory 6a. Then, the operation planning device 6c calculates the consumed energy (B) of the specified period (one day, for example) of the engine cogeneration system 11, the consumed energy (B) being necessary for generating the total of the generated electric power amount and the hot water storage unit hot water supply amount during the operation period (Step S45).

The consumed energy (B) in the specified period (one day, for example) is an indication of the consumed energy reduction at home when introducing the engine cogeneration system 11 to home. The consumed energy (B) denotes a raw material energy (total energy of a material gas consumed by the operation of the engine cogeneration system 11, the electric power for the operation of the engine cogeneration system 11, and the like) necessary for the operation of the engine cogeneration system 11 when generating the generated electric power amount and the hot water storage unit hot water supply amount.

Next, the operation planning device 6c calculates the consumed energy (A) of the specified period (one day, for example) using the generated electric power amount and hot water storage unit hot water supply amount of the engine cogeneration system 11 during the temporarily set operation period (between the start-up time and the stop time) predicted by the operation planning device 6c in Step S44 (Step S5).

The consumed energy (A) in the specified period (one day, for example) is a standard of the consumed energy reduction amount at home when introducing the engine cogeneration system 11 to home. The consumed energy (A) is the total energy in a case where it is assumed that the generated electric power amount and hot water storage unit hot water supply amount of the engine cogeneration system 11 predicted by the operation planning device 6c are entirely covered by not the engine cogeneration system 11 but the electric power and gas supplied from existing infrastructures, such as electric power companies and gas companies.

Next, the operation planning device 6c subtracts the consumed energy (B) of the specified period (one day, for example) of Step S44 from the consumed energy (A) of the specified period (one day, for example) of Step S46 to obtain a value (A−B). The value (A−B) is regarded as the consumed energy reduction amount in the specified period (one day, for example) of the engine cogeneration system 11. The value (A−B) is associated with the combination of the start-up time and stop time temporarily set in Step S44 and stored in the memory 6a (Step S47).

Here, the operation planning device 6c determines whether or not the calculations of the consumed energy reduction amount (A−B) of the specified period (one day, for example) for all the combinations of the start-up time and stop time are finished (Step S48). If all the calculations of the consumed energy reduction amount (A−B) of the specified period (one day, for example) are not finished ("No" in Step S48), Steps S44, S45, S46 and S47 are repeated. If all the calculations of the consumed energy reduction amount (A−B) of the specified period (one day, for example) are finished ("Yes" in Step S48), the process proceeds to the next step.

Further, the operation planning device 6c reads out from the memory 6a and sets the combination of the start-up time and stop time by which the consumed energy reduction amount (A−B) of the specified period (one day, for example)

is maximum, among the plurality of combinations of the start-up time and stop time stored in the memory 6a in Step S47, and the engine cogeneration system 11 is then operated (Step S49).

As above, in accordance with the engine cogeneration system of Embodiment 2, in a case where the operation time of the system exceeds the predetermined maximum operation time (13 hours in the example of Embodiment 2) even if the start-up time and stop time of the system are set by the user, the operation planning device 6c reconfigures the combination of the start-up time and the stop time such that the operation time is equal to or shorter than the maximum operation time and the consumed energy reduction amount of the specified period (one day, for example) is maximum in the period from the start-up time until the stop time set by the user. With this, the suppression of the operation time and the reduction of the consumed energy amount are fulfilled together while satisfying the user's demand regarding the start-up and stop.

In the present embodiment, the maximum operation time is 13 hours, and the specified period whose consumed energy reduction amount is calculated is one day. However, the optimal maximum operation time and the optimal period whose consumed energy reduction amount is calculated may be different from above depending on the electric power load and heat load of the object for which the engine cogeneration system is provided. Even in the case of setting the maximum operation time different from the present embodiment and the period whose consumed energy reduction amount is calculated which period is different from the present embodiment, such case is obviously within the scope of the present invention.

Moreover, the engine cogeneration system has been explained as one example of the energy supply system. However, the same effects as above can be obtained even by a fuel cell cogeneration system using a fuel cell or a turbine power generating system configured to generate electric power by causing a turbine to rotate.

(Embodiment 3)

A cogeneration (heat-electric power supply) system according to Embodiment 3 of the present invention is the same in configuration as the engine cogeneration system 11 according to Embodiment 2 shown in FIG. 8. Explanations of the same components as in Embodiment 2 are omitted.

The remote controller 7 of the present embodiment can set by the operation of the user an operation mode (hot water storage mode) by which the engine cogeneration system 11 starts up and stops based on the amount of hot water in the hot water storage unit 1b.

The operation of the engine cogeneration system 11 set to the hot water storage mode will be explained below.

In a case where the remote controller 7 sets the hot water storage mode, the remote controller 7 can set a maximum hot water storage amount and a minimum hot water storage amount.

For example, the hot water storage unit is divided into four equal parts in the vertical direction, and the hot water storage amount can be set to FULL, ¾, ½, ¼, and 0. In a case where a start-up hot water storage amount is set to ½ and a stop hot water storage amount is set to FULL by the remote controller 7, the system starts up when the hot water storage amount decreases to ½ and the system stops when the hot water storage amount reaches FULL.

Figure 10:
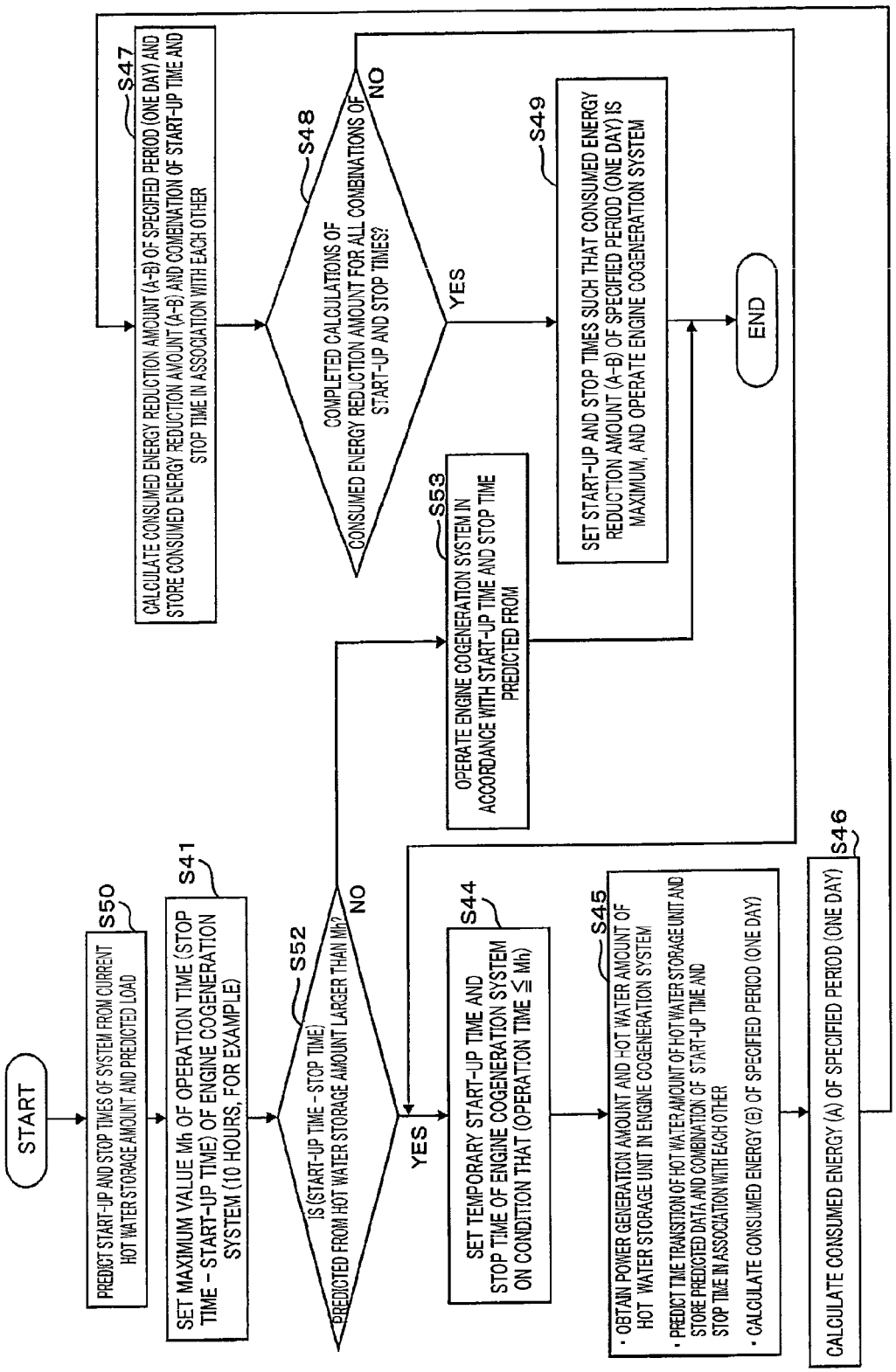
FIG. 10 is a flow chart showing an operation example of the cogeneration system according to Embodiment 3.

FIG. 10 is a flow chart showing the operation example of the cogeneration system according to Embodiment 3.

The same reference signs are used for the components which carry out the same operations as the components according to Embodiment 2 shown in FIG. 9.

First, the operation planning device 6c of the controller 6 predicts the start-up time and stop time of the engine cogeneration system 11 based on the start-up hot water storage amount, the stop hot water storage amount, the predicted electric power load demand, and the predicted heat load demand, which are stored in the memory 6a and set by the remote controller 7.

Next, the maximum operation time setting device 6d sets the maximum operation time Mh of the engine cogeneration system 11 in the specified period (one day, for example) (Step S41), and then the operation planning device 6c compares the time period from the start-up time until the stop time predicted in Step 50 with the maximum operation time Mh (Step S52).

Here, in a case where the time period from the start-up time until the stop time is shorter than or equal to the maximum operation time, the engine cogeneration system is operated in accordance with the start-up time and stop time predicted based on the hot water storage amount (Step S53).

In contrast, in a case where the time period from the start-up time until the stop time is longer than the maximum operation time, one of a plurality of combinations of the start-up time and the stop time by which the operation time becomes equal to or shorter than Mh is set as temporary start-up time and stop time in the period from the start-up time until the stop time originally predicted as the hot water storage mode (Step S44).

The subsequent Steps S45 to S49 are the same as those in Embodiment 2, so that explanations thereof are omitted herein.

As above, in accordance with the engine cogeneration system of Embodiment 3, in a case where the operation time of the system exceeds the predetermined maximum operation time (10 hours in the example of Embodiment 3) even if the user sets the system such that the system starts up and stops based on the hot water storage amount, the operation planning device 6c reconfigures the combination of the start-up time and the stop time such that the operation time is equal to or shorter than the maximum operation time and the consumed energy reduction amount of the specified period (one day, for example) is maximum in the period from the start-up time until the stop time originally predicted as the hot water storage mode. With this, the suppression of the operation time and the reduction of the consumed energy amount are fulfilled together while satisfying the user's demand regarding the start-up and stop.

In the present embodiment, the maximum operation time is 10 hours, and the specified period whose consumed energy reduction amount is calculated is one day. However, the optimal maximum operation time and the optimal period whose consumed energy reduction amount is calculated may be different from above depending on the electric power load and heat load of the object for which the engine cogeneration system is provided. Even in the case of setting the maximum operation time different from the present embodiment and the period whose consumed energy reduction amount is calculated which period is different from the present embodiment, such case is obviously within the scope of the present invention.

Moreover, the engine cogeneration system has been explained as one example of the energy supply system. However, it is obvious that the same effects as above can be obtained even by a fuel cell cogeneration system using a fuel cell or a turbine power generating system configured to generate electric power by causing a turbine to rotate.

(Embodiment 4)

A cogeneration (heat-electric power supply) system according to Embodiment 4 of the present invention is the same in configuration as the fuel cell cogeneration system 1 according to Embodiment 1 shown in FIG. 1. Explanations of components configured to operate in the same manner as the components of Embodiment 1 are omitted.

Figure 11:
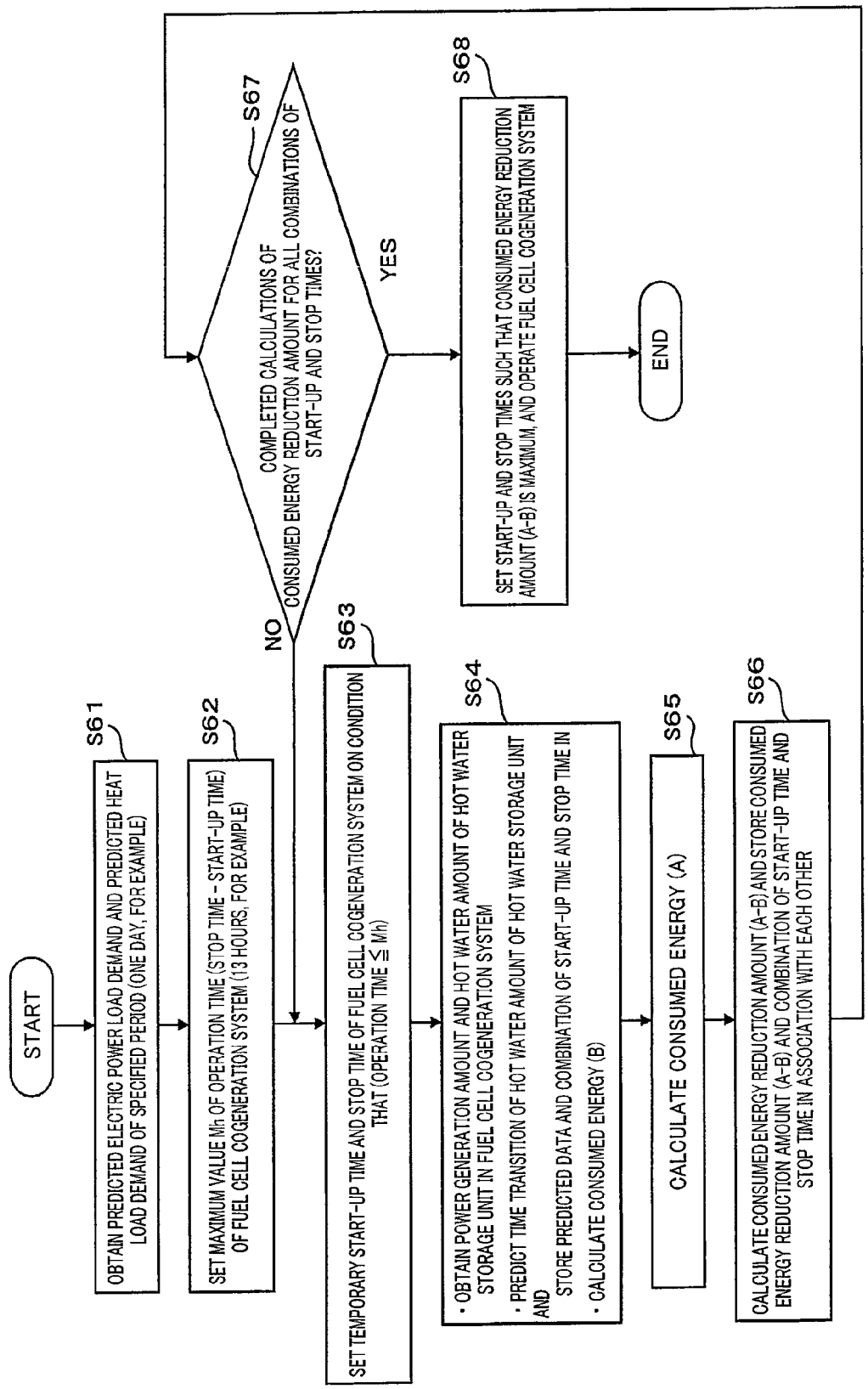
FIG. 11 is a flow chart showing an operation example of the cogeneration system according to Embodiment 4.

FIG. 11 is a flow chart showing the operation example of the cogeneration system according to the present embodiment.

First, the operation planning device 6c of the controller 6 obtains the predicted electric power load demand and predicted heat load demand of the specified period (one day, for example), the demands being stored in the memory 6a (Step S61).

Next, the maximum operation time setting device 6c sets the maximum operation time Mh of the fuel cell cogeneration system 1 in the specified period (one day, for example) (Step S62). Then, from multiple combinations of the start-up time and stop time of the fuel cell cogeneration system 1, the operation planning device 6c sets as a temporary start-up time and stop time one of combinations by which the maximum operation time is equal to or shorter than Mh (Step S63).

Next, based on the start-up time and stop time of the fuel cell cogeneration system 1 temporarily set in Step S63 and the predicted electric power load demand and predicted heat load demand of the specified period (one day, for example) obtained from the memory 6a, the operation planning device 6c calculates the total of the generated electric power amount generated by the fuel cell cogeneration system 1 and the calorie (hot water storage unit hot water supply amount) supplied to the hot water storage unit 1b during the operation period of a case where the cogeneration system is assumed to be operated between the temporarily set start-up time and stop time. In addition, the operation planning device 6c stores in the memory 6a a time transition of the hot water storage unit hot water supply amount predicted in the above calculation. Then, based on the predicted heat load demand obtained from the memory 6a and predict data of the time transition of the hot water storage unit hot water supply amount, the time transition of the amount of hot water stored in the hot water storage unit 1b of the fuel cell cogeneration system 1 (hot water storage unit hot water amount) is predicted on the condition that the hot water is supplied to the heat load to cover the predicted heat load demand as long as a hot water storage tank stores the hot water. The predict data is associated with the combination of the temporarily set start-up time and stop time and stored in the memory 6a. Then, the operation planning device 6c calculates the consumed energy (B) of the fuel cell cogeneration system 1, the consumed energy (B) being necessary for generating the total of the generated electric power amount and the hot water storage unit hot water supply amount during the operation period (Step S64).

Next, the operation planning device 6c calculates the consumed energy (A) using the generated electric power amount and hot water storage unit hot water supply amount of the fuel cell cogeneration system 1 during the temporarily set operation period (between the start-up time and the stop time) predicted by the operation planning device 6c in Step S63 (Step S65).

Next, the operation planning device 6c subtracts the consumed energy (B) of Step S63 from the consumed energy (A) of Step S65 to obtain a value (A−B). The value (A−B) is regarded as the consumed energy reduction amount of the fuel cell cogeneration system 1. The value (A−B) is associated with the combination of the start-up time and stop time temporarily set in Step S63 and stored in the memory 6a (Step S66).

Here, the operation planning device 6c determines whether or not the calculations of the consumed energy reduction amount (A−B) for all the combinations of the start-up time and stop time set such that the operation time becomes equal to or shorter than Mh are finished (Step S67). If all the calculations of the consumed energy reduction amount (A−B) are not finished ("No" in Step S67), Steps S63, S64, S65, and S66 are repeated. If all the calculations of the consumed energy reduction amount (A−B) are finished ("Yes" in Step S67), the process proceeds to the next determination step.

Further, the operation planning device 6c reads out and obtains from the memory 6a the combination of the start-up time and stop time by which the consumed energy reduction amount (A−B) is maximum, among the plurality of combinations of the start-up time and stop time stored in the memory 6a in Step S66. Then, the obtained combination of the start-up time and stop time is set in the fuel cell cogeneration system 1, and the fuel cell cogeneration system 1 is operated (Step S68).

As above, in accordance with the present embodiment, when selecting the temporary operation clock time and stop time of the fuel cell cogeneration system in Step S63 of the flow chart of FIG. 11, the combination of the operation clock time and stop time is selected such that the operation time becomes equal to or shorter than Mh. With this, the number of times of calculations in Steps S64 to S66 is smaller than that of the fuel cell cogeneration system of Embodiment 1. Thus, even if the capacity of the memory 6a is comparatively small, the suppression of the operation time and the reduction of the consumed energy amount are fulfilled together.

Moreover, the difference between the operation plan of the fuel cell cogeneration system of the present embodiment determined by the above method and the operation plan of the conventional fuel cell cogeneration system is the same as the difference between FIGS. 3 and 4 explained for the fuel cell cogeneration system of Embodiment 1.

As is clear from above, in the fuel cell cogeneration system of the present embodiment, the maximum operation time of the system is set, the start-up time and stop time of the system are set by the operation planning device 6c based on the maximum operation time, and the fuel cell cogeneration system is operated. With this, it is possible to provide the fuel cell cogeneration system capable of maximizing the consumed energy reduction amount per operation unit time.

In the present embodiment, the maximum operation time is 13 hours. However, the optimal maximum operation time may change depending on the electric power load and heat load of the object for which the fuel cell cogeneration system is provided. Even if the different maximum operation time from the present embodiment is set, it is obviously within the scope of the present invention.

Moreover, the fuel cell cogeneration system has been explained as one example of the energy supply system. However, the same effects as above can be obtained even by an engine cogeneration system using an engine or a turbine power generating system configured to generate electric power by causing a turbine to rotate by a gas.

(Embodiment 5)

A fuel cell system according to Embodiment 5 of the present invention includes the same components as in Embodiment 1 and will be explained in reference to FIGS. 1 and 8. Explanations of the same components are omitted.

Next, the operation example of the cogeneration system of the present embodiment will be explained in reference to FIG. 12.

First, the operation planning device 6c of the controller 6 obtains the predicted electric power load demand and predicted heat load demand of the specified period (one day, for example), the demands being stored in the memory 6a (Step S401).

Each of the predicted electric power load demand and the predicted heat load demand may be a predicted demand based on the typical electric power and the heat consumption history of the typical heat load, which are prestored in the memory 6a when providing the fuel cell cogeneration system 1 at home, or may be a predicted demand based on the electric power load and the heat consumption history of the heat load, which are changed by the demand predictor 6b in accordance with the progress of the operation of the fuel cell cogeneration system 1 so as to adapt to a life cycle of each home.

Next, the maximum operation time setting device 6c sets the maximum operation time Mh of the fuel cell cogeneration system 1 in the specified period (one day, for example) (Step S402), and then the operation planning device 6c sets one of multiple combinations of the start-up time and stop time of the fuel cell cogeneration system 1 as the temporary start-up time and stop time (Step S403).

Next, based on the start-up time and stop time of the fuel cell cogeneration system 1 temporarily set in Step S403 and the predicted electric power load demand and predicted heat load demand of the specified period (one day, for example) obtained from the memory 6a, the operation planning device 6c calculates the total of the generated electric power amount generated by the fuel cell cogeneration system 1 and the calorie (the amount of hot water corresponding to this calorie; hereinafter referred to as "hot water storage unit hot water supply amount") supplied to the hot water storage unit 1b during the operation period of a case where the cogeneration system is assumed to be operated between the temporarily set start-up time and stop time. In addition, the operation planning device 6c stores in the memory 6a a time transition of the hot water storage unit hot water supply amount predicted in the above calculation. Then, based on the predicted heat load demand obtained from the memory 6a and predict data of the time transition of the hot water storage unit hot water supply amount, the time transition of the amount of hot water stored in the hot water storage unit 1b of the fuel cell cogeneration system 1 (hereinafter referred to as "hot water storage unit hot water amount") is predicted on the condition that the hot water is supplied to the heat load to cover the predicted heat load demand as long as a hot water storage tank stores the hot water. The predict data is associated with the combination of the temporarily set start-up time and stop time and stored in the memory 6a. Then, the operation planning device 6c calculates the consumed energy (B) of the fuel cell cogeneration system 1, the consumed energy (B) being necessary for generating the total of the generated electric power amount and the hot water storage unit hot water supply amount during the operation period (Step S404).

The consumed energy (B) is an indication of the consumed energy reduction at home when introducing the fuel cell cogeneration system 1 to home. The consumed energy (B) denotes a raw material energy (total energy of a material gas consumed by the operation of the fuel cell cogeneration system 1, the electric power for the operation of the fuel cell cogeneration system 1, and the like) necessary for the operation of the fuel cell cogeneration system 1 when generating the generated electric power amount and the hot water storage unit hot water supply amount.

Next, the operation planning device 6c calculates the consumed energy (A) using the generated electric power amount and hot water storage unit hot water supply amount of the fuel cell cogeneration system 1 during the temporarily set operation period (between the start-up time and the stop time) predicted by the operation planning device 6c in Step S403 (Step S405).

The consumed energy (A) is a standard of the consumed energy reduction amount at home when introducing the fuel cell cogeneration system 1 to home. The consumed energy (A) is the total energy in a case where it is assumed that the generated electric power amount and hot water storage unit hot water supply amount of the fuel cell cogeneration system 1 predicted by the operation planning device 6c are entirely covered by not the fuel cell cogeneration system 1 but the electric power and gas supplied from existing infrastructures, such as electric power companies and gas companies.

Next, the operation planning device 6c subtracts the consumed energy (B) of Step S403 from the consumed energy (A) of Step S405 to obtain a value (A−B). The value (A−B) is regarded as the consumed energy reduction amount of the fuel cell cogeneration system 1. The value (A−B) is associated with the combination of the start-up time and stop time temporarily set in Step S403 and stored in the memory 6a (Step S406).

Here, the operation planning device 6c determines whether or not the calculations of the consumed energy reduction amount (A−B) for all the combinations of the start-up time and stop time are finished (Step S407). If all the calculations of the consumed energy reduction amount (A−B) are not finished ("No" in Step S407), Steps S403, S404, S405, and S406 are repeated. If all the calculations of the consumed energy reduction amount (A−B) are finished ("Yes" in Step S407), the process proceeds to the next determination step.

Further, the operation planning device 6c reads out from the memory 6a and sets the combination of the start-up time and stop time by which the consumed energy reduction amount (A−B) is maximum, among the plurality of combinations of the start-up time and stop time stored in the memory 6a in Step S406 (Step S408).

Next, the operation planning device 6c determines based on the predetermined condition whether to apply the maximum operation time Mh set in Step S402 to the combination of the start-up time and stop time set in Step S408 (Step S488). If the condition is not satisfied ("No" in Step S488), the process proceeds to the next determination step.

Among the start-up and stop times of the fuel cell cogeneration system 1 set in Step S408, the operation planning device 6c reconfigures the start-up and stop times by which the consumed energy reduction amount (A−B) per operation unit time is maximum when the operation time of the fuel cell cogeneration system is limited to Mh, and the fuel cell cogeneration system 1 is then operated (Step S409).

Moreover, if the condition is satisfied in Step S488 ("Yes" in Step S488), the fuel cell cogeneration system 1 is operated in accordance with the start-up and stop times set in Step S408 (Step S499).

As described above, it is desirable that the maximum operation time Mh be set based on the electric power load and the heat load. For example, in the winter season in which the electric power load significantly increases and the heat load is large, the setting of the maximum operation time limits the operation time in which the consumed energy reduction is efficiently realized, and a ratio of the energy consumed by the start-up and stop per unit operation time becomes large. Therefore, the setting of the maximum operation time is not desirable to maximize the consumed energy reduction amount per unit operation time. In the case of the above condition, the consumed energy reduction amount per unit time can be maximized by comparatively increasing the maximum operation time. Therefore, in a case where the maximum operation time becomes equal to or longer than the specified period of Step S1, the limitation by the maximum operation time becomes unnecessary, so that whether or not the limitation by the maximum operation time Mh is necessary is determined in Step S488.

It is desirable that whether or not the limitation by the maximum operation time is necessary be set based on the environmental condition that is the calendar information, such as calendar, and the season information including calendar, the environmental condition being a factor deeply related to the degree of the electric power load and the degree of the heat load (for example, the limitation by the maximum operation time is not carried out in December, January, and February). Although not shown, the real time counter configured to manage the calendar and season information, such as calendar, is provided inside the controller 6. Whether or not the limitation is necessary is determined in Step S488 based on the above information. Further, the real time counter may be configured to be provided in the fuel cell 1a or in the hot water storage unit 1b or may be independently provided as a separate device, as with the remote controller 7 in FIG. 8. In this case, the real time counter transfers the information to the controller 6 via communication means or the like.

Moreover, as the factor deeply related to the degree of the electric power load and the degree of the heat load, it is effective to use the environmental condition, such as the outside air temperature, the city water temperature, or the like. Although not shown, a temperature sensor configured to be able to manage the outside air temperature and the city water temperature is provided inside the controller 6. Whether or not the limitation is necessary is determined in Step S488 based on the above information (for example, the limitation by the maximum operation time is not carried out when the outside air temperature is 10° C. or lower). Further, the temperature sensor may be configured to be provided in the fuel cell 1a or in the hot water storage unit 1b or may be independently provided as a separate device, as with the remote controller 7 in FIG. 8. In this case, the temperature sensor transfers the information to the controller 6 via communication means or the like.

Moreover, it is effective to include a means via which the user can input the environmental condition (energy consumption information, such as the season information, the calendar information, the outside air temperature information, the city water temperature information, the family structure information, and the visitor information) which are deeply related to the degree of the used load power and the degree of the heat load demand, and to arbitrary input the information via the means by the user. Although not shown, an environmental condition input device is provided inside the controller 6, and the controller 6 commands the electric power generation based on the information. Further, the environmental condition input device may be configured to be provided in the fuel cell 1a or in the hot water storage unit 1b or may be independently provided as a separate device, as with the remote controller 7 in FIG. 8. In this case, the environmental condition input device transfers the information to the controller 6 via communication means or the like.

As above, in accordance with the fuel cell cogeneration system of the present embodiment, in the summer season for example, the maximum operation time of the system is set, and the consumed energy reduction amount is maintained at a high level while suppressing the operation time. Simultaneously, in the winter season for example, the limitation by the maximum operation time is not set, and the consumed energy reduction amount can be maintained at a high level by not suppressing the operation time.

In the present embodiment, the maximum operation time Mh is set in Step S2, and whether or not the limitation by the maximum operation time Mh is necessary is determined in Step S488. However, the same effects as above can be obtained even in a case where whether or not the limitation is necessary is determined when setting the maximum operation time Mh in Step S2. This is clearly within the scope of the present invention.

Moreover, the fuel cell cogeneration system has been explained as one example of the energy supply system. However, the same effects as above can be obtained even by an engine cogeneration system using an engine or a turbine power generating system configured to generate electric power by causing a turbine to rotate by a gas.

Modification Example 4

Figure 12:
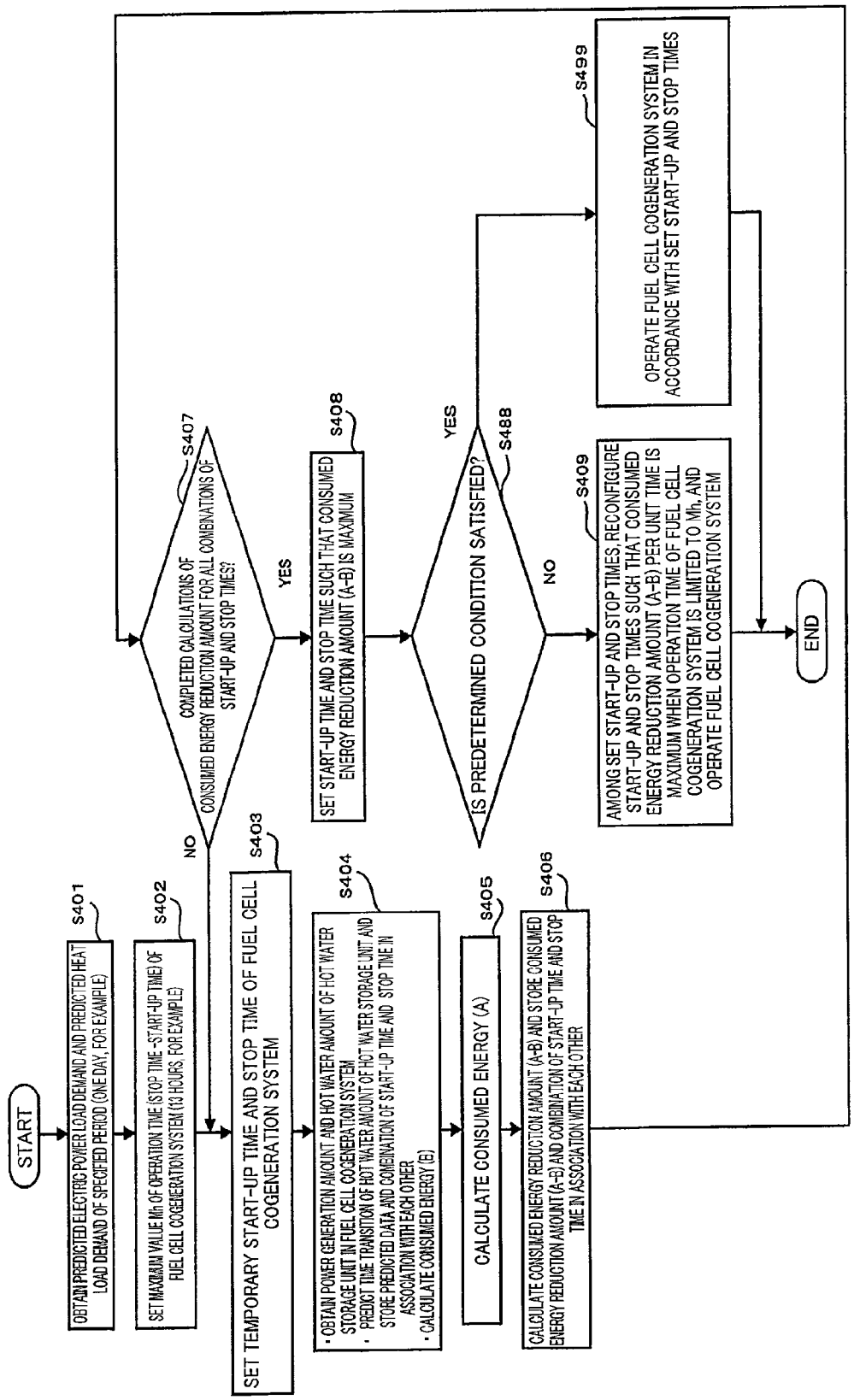
FIG. 12 is a flow chart showing an operation example of the cogeneration system according to Embodiment 5.

The present embodiment has described one example of the operation plan of the fuel cell cogeneration system 1 which determines whether or not the limitation by the maximum operation time Mh is necessary in Step S488 of the flow chart of FIG. 12 based on the environmental conditions, such as the season information, the calendar information, the outside air temperature information, and the city water temperature information.

However, whether or not the limitation is necessary may be determined based on not only the environmental condition but also the status of the fuel cell cogeneration system 1. In this case, although the predetermined condition of Step S488 of the flow chart of FIG. 12 is different, the other steps are the same, so that explanations thereof are omitted.

As described above, it is desirable that the maximum operation time Mh be set based on the status of the fuel cell cogeneration system 1. Before the performance degradation of the system occurs, that is, when the operation efficiency of the system is high, the setting of the maximum operation time limits the operation time in which the consumed energy reduction is efficiently realized, and the ratio of the energy consumed by the start-up and stop per unit operation time becomes large. Therefore, the setting of the maximum operation time is not desirable to maximize the consumed energy reduction amount per unit operation time. In the case of the above condition, the consumed energy reduction amount per unit time can be maximized by comparatively increasing the maximum operation time. Therefore, in a case where the maximum operation time becomes equal to or longer than the specified period of Step S1, the limitation by the maximum operation time becomes unnecessary, so that whether or not the limitation by the maximum operation time Mh is necessary is determined in Step S488.

It is desirable that whether or not the limitation by the maximum operation time is necessary be determined based on system operation history information, such as a total energized time or a total power generating time, which is a history from power-on after installation and is a factor deeply related to the operation efficiency of the system (for example, the limitation by the maximum operation time is not carried out if the total power generating time is shorter than 20,000 hours). Although not shown, the real time counter configured to manage the system operation history information, such as the total energized time or the total power generating time, is provided inside the controller 6. Whether or not the limitation is necessary is determined in Step S488 based on the above information. Further, the real time counter may be configured to be provided in the fuel cell 1a or in the hot water storage unit 1b or may be independently provided as a separate device, as with the remote controller 7 in FIG. 8. In this case, the real time counter transfers the information to the controller 6 via communication means or the like.

Moreover, it is desirable that whether or not the limitation by the maximum operation time is necessary be determined based on an elapsed time since the production of the system at a factory, the elapsed time being the factor deeply related to the operation efficiency of the system (for example, the limitation by the maximum operation time is not carried out if the elapsed time since the production at the factory is shorter than five years). Although not shown, the real time counter configured to manage the elapsed time of the system is provided inside the controller 6. Whether or not the limitation is necessary is determined in Step S488 based on the above information. Further, the real time counter may be configured to be provided in the fuel cell 1a or in the hot water storage unit 1b or may be independently provided as a separate device, as with the remote controller 7 in FIG. 8. In this case, the real time counter transfers the information to the controller 6 via communication means or the like.

Moreover, it is desirable that the operation efficiency of the system be directly monitored and whether or not the limitation by the maximum operation time is necessary be determined based on the operation efficiency of the system (for example, the limitation by the maximum operation time is not carried out until the operation efficiency decreases by 30% from an initial efficiency of the system). Although not shown, the real time counter configured to manage the operation efficiency of the system is provided inside the controller 6. Whether or not the limitation is necessary is determined in Step S488 based on the above information. Further, the real time counter may be provided in the fuel cell 1a or in the hot water storage unit 1b or may be independently provided as a separate device, as with the remote controller 7 in FIG. 8. In this case, the real time counter transfers the information to the controller 6 via communication means or the like.

As above, in accordance with the fuel cell cogeneration system of the present embodiment, the maximum operation time is set in a life latter period in which the operation efficiency of the system has deteriorated, so that the consumed energy reduction amount can be maintained at a high level while suppressing the operation time. Simultaneously, the limitation by the maximum operation time is not set in a life initial period in which the operation efficiency of the system has not deteriorated yet, so that the consumed energy reduction amount can be maintained at a high level by not suppressing the operation time.

Further, by determining whether or not the limitation by the maximum operation time is necessary based on the elapsed time since the production at the factory, the consumed energy reduction amount can be maintained at a higher level while also considering the deterioration of the operation efficiency due to a storage situation after the production.

In the present embodiment, the maximum operation time Mh is set in Step S2, and whether or not the limitation by the maximum operation time Mh is necessary is determined in Step S488. However, the same effects as above can be obtained even in a case where whether or not the limitation is necessary is determined when setting the maximum operation time Mh in Step S2. This is clearly within the scope of the present invention.

Moreover, the fuel cell cogeneration system has been explained as one example of the energy supply system. However, the same effects as above can be obtained even by an engine cogeneration system using an engine or a turbine power generating system configured to generate electric power by causing a turbine to rotate by a gas.

(Embodiment 6)

A fuel cell system according to Embodiment 6 of the present invention is applied to the same components as in Embodiments 1, 2, 3, and 4. An example in which a representative example is applied to Embodiment 1 will be explained in reference to FIGS. 1 and 8, and its explanation is omitted.

It is desirable that in Embodiment 1, the specified period set by the period setting device 6e be set based on the electric power load demand and heat load demand to be used.

For example, in a case where the specified period is set to one day in the summer season in which the electric power load demand significantly increases but the heat load demand is not large, the heat load corresponding to the generated electric power which has covered the used electric power exceeds the heat load demand. Therefore, the heat load in the hot water storage unit reaches a heat storage limit, so that a fuel cell electric power generator stops generating the electric power. When the accumulated heat load falls below the heat storage limit, the system starts up again. In consideration of the loss of the energy necessary for the start-up at this time, the operation plan can be set such that in the summer season, the specified period is set to multiple days (two days, for example) by the period setting device 6e and the consumed energy reduction amount is increased with respect to the heat load demand generated in this specified period.

Further, for example, in the winter season in which the electric power load demand significantly increases and the heat load demand is large, the heat load corresponding to the generated electric power which has covered the used electric power does not exceed the heat load demand, and the heat load does not reach the heat storage limit of the hot water storage unit even if the system operates continuously. Therefore, the system can operate continuously. On this account, in a case where the specified period is limited to one day, unnecessary start-up and stop are carried out. In consideration of the loss of the energy necessary for such start-up and stop, in the winter season for example, the specified period is set to multiple days (five days, for example) by the period setting device 6e, and the heat load demand is used while being shared in the specified period. With this, the consumed energy reduction amount can be increased.

Moreover, for example, in the intermediate season, such as spring or autumn, whose conditions are different from the above conditions, that is, in a case where a ratio of the electric power load demand and the heat load demand is similar to an output ratio of the electric power and the heat of the fuel cell electric power generator, and the specified period is long, that is, multiple days or the like, a time period in which the electric power load demand is low becomes long. As a result, a low-output operation time in which a device efficiency is low becomes long. Therefore, the consumed energy reduction amount per operation unit time is smaller than that in a case where the operation is not carried out in the time period in which the electric power load demand is low. On this account, by setting the specified period to a short period, such as one day, the operation in the period in which the electric power load demand is low can be eliminated from the operation plan. As a result, an operation output of the fuel cell system can be increased, and the consumed energy reduction amount per operation unit time can be increased.

Therefore, changing the specified period by the period setting device 6e based on the degree of the electric power load demand and the degree of the heat load demand is found to be effective to increase the consumed energy reduction amount.

Here, the specified period is set as needed by the period setting device 6e so as to correspond to the environmental condition that is the calendar information, such as calendar, or the season information including calendar, the environmental condition being the factor related to the degree of the electric power load demand and the degree of the heat load demand. In the present embodiment, the period setting device 6e sets the specified period to two days in July to September, one day in October to November and April to June, and seven days in November to March. As compared to the above case, in a case where the specified period is uniformly set to one day, the start-up and stop increases by surplus heat and the consumed energy reduction amount decreases in the summer season, and the consumed energy reduction amount decreases by the energy loss caused by the start-up and stop in the winter season. In the present embodiment, the specified period is set to two days in July to September, one day in October to November and April to June, and seven days in November to March. However, these values change depending on device use environments (such as regions, family structures, and device outputs). Therefore, the specified period is set optimally, and the setting changes depending on situations. Although not shown, the real time counter configured to manage the calendar and season information, such as calendar, is provided inside the controller 6. By changing the specified period as needed based on the information by the period setting device 6e and creating the operation plan, the specified period can be set to correspond to a period corresponding to the electric power load demand and heat load demand. This is effective to increase the consumed energy reduction amount.

The real time counter may not be provided in the controller 6 as long as the information thereof can be transferred to the operation planning device 6c. The real time counter may be provided anywhere as long as the information transmission can be carried out.

Modification Example 5

Further, the specified period is set as needed by the period setting device 6e so as to correspond to the outside air temperature used as the environmental condition that is the factor related to the degree of the used load power and the degree of the heat load demand. In the present modification example, the period setting device 6e sets the specified period to two days in a case where an average daily outside air temperature is 21° C. or higher, one day in a case where the average daily outside air temperature is higher than 12° C. and lower than 21° C., and seven days in a case where the average daily outside air temperature is 12° C. or lower. As compared to the above case, in a case where the specified period is uniformly set to one day, the start-up and stop increase by the surplus heat and the consumed energy reduction amount decreases in the period in which the average daily outside air temperature is 21° C. or higher, and the consumed energy reduction amount decreases by the energy loss caused by the start-up and stop in the period in which the average daily outside air temperature is 12° C. or lower.

In the present modification example, the specified period is set to two days in a case where the average daily outside air temperature is 21° C. or higher, one day in a case where the average daily outside air temperature is higher than 12° C. and lower than 21° C., and seven days in a case where the average daily outside air temperature is 12° C. or lower. However, these values change depending on device use environments (such as regions, family structures, and device outputs). Therefore, the specified period is set optimally, and the setting changes depending on situations. Although not shown, a temperature sensor configured to be able to manage the outside air temperature is provided inside the controller 6. The period setting device 6e changes the specified period as needed based on the information, and the operation planning device 6c creates the operation plan. With this, the specified period can be set to correspond to the period corresponding to the electric power load demand and heat load demand. This is effective to increase the consumed energy reduction amount.

The temperature sensor may not be provided in the controller 6 as long as the information thereof can be transferred to the operation planning device 6c. The temperature sensor may be provided anywhere as long as the information transmission can be carried out.

Modification Example 6

Further, the specified period is set as needed by the period setting device 6 so as to correspond to the city water temperature used as the environmental condition that is the factor related to the degree of the used load power and the degree of the heat load demand.

In the present modification example, the period setting device 6e sets the specified period to two days in a case where the average daily city water temperature is 20° C. or higher, one day in a case where the average daily city water temperature is higher than 15° C. and lower than 20° C., and seven days in a case where the average daily city water temperature is 15° C. or lower. As compared to the above case, in a case where the specified period is uniformly set to one day, the start-up and stop increases by the surplus heat and the consumed energy reduction amount decreases in the period in which the average daily city water temperature is 20° C. or higher, and the consumed energy reduction amount decreases by the energy loss caused by the start-up and stop in the period in which the average daily city water temperature is 15° C. or lower. In the present modification example, the specified period is set to two days in a case where the average daily city water temperature is 20° C. or higher, one day in a case where the average daily city water temperature is higher than 15° C. and lower than 20° C., and seven days in a case where the average daily city water temperature is 15° C. or lower. However, these values change depending on device use environments (such as regions, family structures, and device outputs). Therefore, the specified period is set optimally, and the setting changes depending on situations. Although not shown, a city water temperature sensor configured to be able to manage the city water temperature is provided inside the controller 6. The period setting device 6e changes the specified period as needed based on the information, and the operation planning device 6c creates the operation plan. With this, the specified period can be set as needed to correspond to the period corresponding to the electric power load demand and heat load demand. This is effective to increase the consumed energy reduction amount.

The city water temperature sensor may not be provided in the controller 6 as long as the information thereof can be transferred to the operation planning device 6c. The city water temperature sensor may be provided anywhere as long as the information transmission can be carried out.

Modification Example 7

Further, the specified period is set as needed by the period setting device 6e so as to correspond to the energy consumption (consumed energy A) of an object to which the energy is supplied, the energy consumption being used as the environmental condition that is the factor related to the degree of the used load power and the degree of the heat load demand, the energy consumption directly affecting the value of the used load power and the value of the heat load demand. In the present modification example, the period setting device $6e$ sets the specified period to two days in a case where the predicted electric power load demand per day is more than 10.7 kwh and less than 17.2 kwh or the predicted heat load demand per day is less than 10.6 kwh, one day in a case where the predicted electric power load demand per day is 10.7 kwh or lower or the predicted heat load demand per day is more than 10.6 kwh and lower than 21.3 kwh, and seven days in a case where the predicted electric power load demand per day is 17.2 kwh or more or the predicted heat load demand per day is 21.3 kwh or more. As compared to the above case, in a case where the specified period is uniformly set to one day, the start-up and stop increases by the surplus heat and the consumed energy reduction amount decreases in the period in which the predicted electric power load demand per day is more than 10.7 kwh and less than 17.2 kwh or in the period in which the predicted heat load demand per day is less than 10.6 kwh, and the consumed energy reduction amount decreases by the energy loss caused by the start-up and stop in the period in which the predicted electric power load demand per day is 17.2 kwh or more or the predicted heat load demand per day is 21.3 kwh or more.

In the present modification example, the specified period is set to two days in a case where the predicted electric power load demand per day is more than 10.7 kwh and less than 17.2 kwh or the predicted heat load demand per day is less than 10.6 kwh, one day in a case where the predicted electric power load demand per day is 10.7 kwh or lower or the predicted heat load demand per day is more than 10.6 kwh and lower than 21.3 kwh, and seven days in a case where the predicted electric power load demand per day is 17.2 kwh or more or the predicted heat load demand per day is 21.3 kwh or more. However, these values change depending on device use environments (such as regions, family structures, and device outputs). Therefore, the specified period is set optimally, and the setting changes depending on situations. Although not shown, the specified period is changed as needed based on the information of the consumed energy A calculated from the predicted electric power load demand and predicted heat load demand of the predictor $6b$ and the memory $6a$, and the operation plan is created. With this, the specified period can be set as needed to correspond to the period corresponding to the electric power load demand and heat load demand. This is effective to increase the consumed energy reduction amount.

Modification Example 8

Further, a means is included, via which the user can input a condition related to the degree of the used load power and the degree of the heat load demand, that is, the environmental condition that is the energy consumption information, such as the season information, the calendar information, the outside air temperature information, the city water temperature information, the family structure information, or the visitor information. Thus, the user can arbitrarily input the condition. The specified period is set as needed by the period setting device 6 so as to correspond to the condition. Although not shown, this environmental condition input means (for example, an operation substrate, such as a remote controller) is provided inside the controller 6. The specified period is changed as needed based on the information by the operation planning device $6c$, and the operation plan is created. With this, the specified period can be set as needed to correspond to the period corresponding to the electric power load demand and heat load demand. This is effective to increase the consumed energy reduction amount.

The environmental condition input means may not be provided in the controller 6 as long as the information thereof can be transferred to the operation planning device $6c$. The environmental condition input means may be provided anywhere as long as the information transmission can be carried out.

The foregoing has explained Embodiment 6 applied to Embodiment 1. However, the same effects can be obtained even if Embodiment 6 is applied to Embodiment 2, 3, or 4.

Moreover, a current set level of the specified period and a current set level of the predicted load demand are displayed on the environmental condition input means, the device main body, or the other display device via signals. With this, the user can recognize a current device operation status and does not have the status confused with a device operation malfunction. In addition, the user leads a life in accordance with the situation. Therefore, an error between a combination of the predicted electric power load demand and predicted heat load demand and a combination of the actually used electric power and heat load becomes small. As a result, the operation plan accurately corresponding to the predicted load demand can be created. On this account, the consumed energy reduction amount can be further increased.

(Embodiment 7)

A fuel cell system according to Embodiment 7 of the present invention is applied to the same components as in Embodiments 1, 2, 3, and 4. An example in which a representative example is applied to Embodiment 1 will be explained in reference to FIGS. 1 and 8, and its explanation is omitted.

It is desirable that in Embodiment 1, the maximum operation time Mh be set in accordance with the electric power load and heat load to be used.

To be specific, in an operation determination of the conventional fuel cell electric power generator, the operation determination is commanded even in a case where a small consumed energy reduction amount is obtained. As described above, the fuel cell power generating system can realize high device efficiency in a case where it is operated by high output. In the operation based on the conventional operation determination, the operation may be planned to be carried out by the output by which the device efficiency is comparatively low. In this case, the consumed energy reduction amount per operation unit time of the consumed energy reduction amount generated in the specified period may become a low value. On this account, by setting the maximum operation time Mh in accordance with the load situation, the operation plan of the fuel cell power generating system can be changed from the operation plan significantly including the low output operation to the operation plan mainly including the high output operation. As a result, the consumed energy reduction amount in a life operable time corresponding to device durability can be maximized.

Here, the operation plan (combination of the operation start time and the operation stop time) is variously set such that the total operation time does not exceed the maximum operation time Mh in the specified period. Next, the predicted consumed energy reduction amount in the specified period is calculated. Then, the operation plan is set such that the consumed energy reduction amount per unit operation time in the specified period is maximum, the amount being obtained by dividing the total consumed energy reduction amount obtained in the specified period by the total operation time in the specified period. Then, this operation plan is output to the fuel cell power generating system. With this, it is possible to maximize the consumed energy reduction amount which is obtained by the device in a lifetime.

The maximum operation time Mh is set so as to correspond to the electric power load demand situation and the heat load demand situation. With this, the consumed energy reduction amount can be increased.

For example, in a case where Mh is set to the maximum operation time in the specified period in the summer season in which the electric power load demand significantly increases but the heat load demand is not large, the heat load corresponding to the generated electric power which has covered the electric power demand exceeds the heat load demand. Therefore, the heat load in the hot water storage unit reaches the heat storage limit, so that the fuel cell electric power generator stops generating the electric power. When the accumulated heat load falls below the heat storage limit, the system starts up again. Thus, it becomes difficult to carry out the operation such that a region where the device output is high is prioritized.

Further, in the summer season, the electric power load significantly changes depending of the time period (for example, a difference between daytime and nighttime), and the average electric power load is not large, so that it is difficult to carry out the operation of the device in the high output region. In order to avoid the loss of the energy necessary for the start-up at this time and the low output region as much as possible, Mh is limited to as short a period as possible. With this, the operation determination is carried out such that the operation is selectively carried out in the region of a high output used electric power predicted value so as to satisfy a heat load demand predicted value in the specified period. Thus, it is possible to maximize the consumed energy reduction amount per unit operation time.

Further, for example, in a case where the maximum operation time Mh is set to one day in the winter season in which the electric power load demand significantly increases and the heat load demand is large, the heat load corresponding to the generated electric power which has covered the used electric power does not exceed the heat load demand, and the heat load does not reach the heat storage limit of the hot water storage unit even if the system operates continuously. Further, since the electric power load demand is large and the output is high, the operation can be carried out in the region where the device efficiency is also high. On this account, in a case where the maximum operation time Mh is set to be significantly shorter than the specified period, the operation time in which the consumed energy reduction amount is efficiently realized is limited, and the ratio of the energy consumed by the start-up and stop per unit operation time becomes large. This is not desirable to maximize the consumed energy reduction amount per unit operation time. In the case of the above condition, the consumed energy reduction amount per unit time can be maximized by comparatively increasing the maximum operation time Mh.

Moreover, for example, in the intermediate season, such as spring or autumn, whose conditions are different from the above conditions, that is, in a case where a ratio of the electric power load demand and the heat load demand is similar to an output ratio of the electric power and the heat of the fuel cell electric power generator, and the maximum operation time Mh is long, a time period in which the electric power load demand is low becomes long. As a result, the low-output operation time in which the device efficiency is low becomes long. Therefore, the consumed energy reduction amount per unit time is smaller than that in a case where the operation is not carried out in the time period in which the electric power load demand is low. On this account, it is desirable that the maximum operation time Mh be set to an intermediate time between the maximum operation time in summer and the maximum operation time in winter.

Therefore, it is desirable that as with the specified period, the maximum operation time Mh be set by the maximum operation time setting device $6d$ based on the electric power load demand situation and the heat load demand situation.

Here, the maximum operation time Mh is set as needed so as to correspond to the environmental condition that is the calendar information, such as calendar, or the season information including calendar, the environmental condition being the factor related to the degree of the electric power load demand and the degree of the heat load demand. In the present embodiment, the maximum operation time Mh is set to two days in July to September, one day in October to November and April to June, and seven days in November to March. As compared to the above case, in a case where the maximum operation time Mh is uniformly set to one day, the start-up and stop increases by the surplus heat and the consumed energy reduction amount decreases in the summer season, and the consumed energy reduction amount decreases by the energy loss caused by the start-up and stop in the winter season. In the present embodiment, the maximum operation time Mh is set to two days in July to September, one day in October to November and April to June, and seven days in November to March. However, these values change depending on device use environments (such as regions, family structures, and device outputs). Therefore, the maximum operation time Mh is set optimally, and the setting changes depending on situations. Although not shown, the real time counter configured to manage the calendar and season information, such as calendar, is provided inside the controller 6. By changing the maximum operation time Mh as needed based on the information by the operation planning device $6c$ and creating the operation plan, the maximum operation time Mh can be set to correspond to a period corresponding to the electric power load demand and heat load demand. This is effective to increase the consumed energy reduction amount.

The real time counter may not be provided in the controller 6 as long as the information thereof can be transferred to the operation planning device $6c$. The real time counter may be provided anywhere as long as the information transmission can be carried out.

Modification Example 9

Further, the maximum operation time Mh is set as needed so as to correspond to the outside air temperature used as the environmental condition that is the factor related to the degree of the used load power and the degree of the heat load demand. In the present modification example, the maximum operation time ME is set to two days in a case where the average daily outside air temperature is 21° C. or higher, one day in a case where the average daily outside air temperature is higher than 12° C. and lower than 21° C., and seven days in a case where the average daily outside air temperature is 12° C. or lower. As compared to the above case, in a case where the maximum operation time Mh is uniformly set to one day, the start-up and stop increase by the surplus heat and the consumed energy reduction amount decreases in the period in which the average daily outside air temperature is 21° C. or higher, and the consumed energy reduction amount decreases by the energy loss caused by the start-up and stop in the period in which the average daily outside air temperature is 12° C. or lower. In the present modification example, the maximum operation time Mh is set to two days in a case where the average daily outside air temperature is 21° C. or higher, one day in a case where the average daily outside air temperature is higher than 12° C. and lower than 21° C., and seven days in a case where the average daily outside air temperature is 12° C. or lower. However, these values change depending on device use environments (such as regions, family structures, and device outputs). Therefore, the maximum operation time Mh is set optimally, and the setting changes depending on situations. Although not shown, a temperature sensor configured to be able to manage the outside air temperature is provided inside the controller 6. The operation planning device 6c changes the maximum operation time Mh as needed based on the information and creates the operation plan. With this, the maximum operation time Mh can be set to correspond to the period corresponding to the electric power load demand and heat load demand. This is effective to increase the consumed energy reduction amount.

The temperature sensor may not be provided in the controller 6 as long as the information thereof can be transferred to the operation planning device 6c. The temperature sensor may be provided anywhere as long as the information transmission can be carried out.

Modification Example 10

Further, the maximum operation time Mh is set as needed so as to correspond to the city water temperature used as the environmental condition that is the factor related to the degree of the used load power and the degree of the heat load demand. In the present modification example, the maximum operation time Mh is set to two days in a case where the average daily city water temperature is 20° C. or higher, one day in a case where the average daily city water temperature is higher than 15° C. and lower than 20° C., and seven days in a case where the average daily city water temperature is 15° C. or lower. As compared to the above case, in a case where the maximum operation time Mh is uniformly set to one day, the start-up and stop increases by the surplus heat and the consumed energy reduction amount decreases in the period in which the average daily city water temperature is 20° C. or higher, and the consumed energy reduction amount decreases by the energy loss caused by the start-up and stop in the period in which the average daily city water temperature is 15° C. or lower. In the present modification example, the maximum operation time Mh is set to two days in a case where the average daily city water temperature is 20° C. or higher, one day in a case where the average daily city water temperature is higher than 15° C. and lower than 20° C., and seven days in a case where the average daily city water temperature is 15° C. or lower. However, these values change depending on device use environments (such as regions, family structures, and device outputs). Therefore, the maximum operation time Mh is set optimally, and the setting changes depending on situations. Although not shown, a city water temperature sensor configured to be able to manage the city water temperature is provided inside the controller 6. The operation planning device 6c changes the maximum operation time Mh as needed based on the information and creates the operation plan. With this, the maximum operation time Mh can be set as needed to correspond to the period corresponding to the electric power load demand and heat load demand. This is effective to increase the consumed energy reduction amount.

The city water temperature sensor may not be provided in the controller 6 as long as the information thereof can be transferred to the operation planning device 6c. The city water temperature sensor may be provided anywhere as long as the information transmission can be carried out.

Modification Example 11

Further, the maximum operation time Mh is set as needed so as to correspond to the energy consumption (consumed energy A) of the object to which the energy is supplied, the energy consumption being used as the environmental condition that is the factor related to the degree of the used load power and the degree of the heat load demand, the energy consumption directly affecting the value of the used load power and the value of the heat load demand. In the present modification example, the maximum operation time Mh is set to two days in a case where the predicted electric power load demand per day is more than 10.7 kwh and less than 17.2 kwh or the predicted heat load demand per day is less than 10.6 kwh, one day in a case where the predicted electric power load demand per day is 10.7 kwh or lower or the predicted heat load demand per day is more than 10.6 kwh and lower than 21.3 kwh, and seven days in a case where the predicted electric power load demand per day is 17.2 kwh or more or the predicted heat load demand per day is 21.3 kwh or more. As compared to the above case, in a case where the maximum operation time Mh is uniformly set to one day, the start-up and stop increases by the surplus heat and the consumed energy reduction amount decreases in the period in which the predicted electric power load demand per day is more than 10.7 kwh and less than 17.2 kwh or in the period in which the predicted heat load demand per day is less than 10.6 kwh, and the consumed energy reduction amount decreases by the energy loss caused by the start-up and stop in the period in which the predicted electric power load demand per day is 17.2 kwh or more or the predicted heat load demand per day is 21.3 kwh or more.

In the present modification example, the specified period is set to two days in a case where the predicted electric power load demand per day is more than 10.7 kwh and less than 17.2 kwh or the predicted heat load demand per day is less than 10.6 kwh, one day in a case where the predicted electric power load demand per day is 10.7 kwh or lower or the predicted heat load demand per day is more than 10.6 kwh and lower than 21.3 kwh, and seven days in a case where the predicted electric power load demand per day is 17.2 kwh or more or the predicted heat load demand per day is 21.3 kwh or more. However, these values change depending on device use environments (such as regions, family structures, and device outputs). Therefore, the specified period is set optimally, and the setting changes depending on situations. The maximum operation time Mh is changed as needed based on the information of the consumed energy A calculated from the predicted electric power load demand and predicted heat load demand of the predictor 6b and the memory 6a, and the operation plan is created. With this, the maximum operation time Mh can be set to correspond to the period corresponding to the electric power load demand and heat load demand. This is effective to increase the consumed energy reduction amount.

Modification Example 12

Further, a means is included, via which the user can input the condition related to the degree of the used load power and the degree of the heat load demand, that is, the environmental condition that is the energy consumption information, such as the season information, the calendar information, the outside air temperature information, the city water temperature information, the family structure information, or the visitor information. Thus, the user can arbitrarily input the condition. The maximum operation time Mh is set as needed so as to correspond to the condition. Although not shown, this environmental condition input means (for example, an operation substrate, such as a remote controller) is provided inside the controller 6. The maximum operation time Mh is changed as needed based on the information by the operation planning device 6c, and the operation plan is created. With this, the maximum operation time Mh can be set as needed to correspond to the period corresponding to the electric power load demand and heat load demand. This is effective to increase the consumed energy reduction amount.

The environmental condition input means may not be provided in the controller 6 as long as the information thereof can be transferred to the operation planning device 6c. The environmental condition input means may be provided anywhere as long as the information transmission can be carried out.

The foregoing has explained Embodiment 7 applied to Embodiment 1. However, the same effects can be obtained even if Embodiment 7 is applied to Embodiment 2, 3, or 4.

Moreover, a current set level of the maximum operation time Mh and a current set level of the predicted load demand are displayed on the environmental condition input means, the device main body, or the other display device via signals. With this, the user can recognize a current device operation status and does not have the status confused with a device operation malfunction. In addition, the user leads a life in accordance with the situation. Therefore, an error between a combination of the predicted electric power load demand and predicted heat load demand and a combination of the actually used electric power and heat load becomes small. As a result, the operation plan corresponding to the accurate predicted load demand can be created. On this account, the consumed energy reduction amount can be further increased.

(Embodiment 8)

A fuel cell system according to Embodiment 8 of the present invention is applied to the same components as in Embodiments 1, 2, 3, and 4. An example in which a representative example is applied to Embodiment 1 will be explained in reference to FIGS. 1 and 8, and its explanation is omitted.

It is desirable that in Embodiment 1, the specified period be set by the period setting device 6e based on the operation status of the energy supply device to be used.

For example, in the case of maximizing the consumed energy reduction amount with respect to the predicted electric power load demand and predicted heat load demand, the consumed energy B needs to be calculated. This calculation requires a device operation efficiency (power generation efficiency and heat recovery efficiency). In the case of the fuel cell electric power generator, the power generation efficiency and the heat recovery efficiency changes with time. The power generation efficiency tends to decrease whereas the heat recovery efficiency tends to increase. This largely attribute to the performance of the fuel cell (not shown) configured to convert the hydrogen energy in the fuel cell electric power generator into the electric power energy. The electric power conversion efficiency of the fuel cell deteriorates by an electric power loss caused by an electric power resistive loss increase caused by a temporal increase in electric conductivity of an internal cell (electric power generating body) or by an electric power loss caused by an electromotive force decrease caused by a reaction rate decrease caused by a temporal catalyst deterioration. Moreover, as the other typical temporal loss increase factor, there is an electric power loss increase caused by, for example, a friction loss increase of an actuator (for example, a pump, not shown) configured to cause a fluid (such as a material gas or cooling water) necessary for electric power generation and heat recovery to flow through the system. Further, there is aged deterioration due to the deterioration of parts of a drive circuit portion configured to control each actuator, and the aged deterioration increases as the electric power loss. By the decrease of the power generation efficiency with time, the electric power conversion loss is converted into the heat loss, a part thereof is recovered as the heat, and the heat recovery efficiency tends to increase.

On this account, even if the predicted electric power load demand and the predicted heat load demand are constant, changes occur depending on the length of the set specified period.

To be specific, in a device (aged-state device) which has been changed to a state where the power generation efficiency is low and the heat recovery efficiency is high with respect to a device (initial-state device) in a state where the initial power generation efficiency is high and the heat recovery efficiency is low, in a case where the specified period is set to, for example, one day, the heat load corresponding to the generated electric power which has covered the electric power demand exceeds the heat load demand. Therefore, the heat load in the hot water storage unit reaches the heat storage limit, so that the fuel cell electric power generator stops generating the electric power. When the accumulated heat load falls below the heat storage limit, the system starts up again. In consideration of the loss of the energy necessary for the start-up at this time, in the case of the aged-state device, the specified period is set to multiple days (two days, for example) by the period setting device 6d, and the operation plan is created using the heat load demand generated by the multiple days. With this, the consumed energy reduction amount can be increased.

Further, for example, in the winter season in which the electric power load demand significantly increases and the heat load demand is large, the heat load corresponding to the generated electric power which has covered the used electric power does not exceed the heat load demand, and the heat load does not reach the heat storage limit of the hot water storage unit even if the system operates continuously. Therefore, the system can operate continuously. On this account, in a case where the specified period is limited to one day, unnecessary start-up and stop are carried out. In consideration of the loss of the energy necessary for such start-up and stop, in the winter season for example, even in the case of the aged-state device, the specified period is set by the period setting device 6e to the multiple days (five days, for example) that is the same as the case of the initial-state device, and the operation plan is created while sharing the heat load demand generated in the multiple days. With this, the consumed energy reduction amount can be increased.

Moreover, even in the intermediate season, such as spring or autumn, whose conditions are different from the above conditions, the ratio of the electric power load demand and the heat load demand and the output ratio of the electric power and the heat of the fuel cell electric power generator are different from each other in the initial-state device and the aged-state device. Therefore, by setting the specified period in accordance with the device status and the load status at this time, the operation in the period in which the electric power load demand is low can be eliminated from the operation plan. As a result, the operation output of the fuel cell system can be increased, and the consumed energy reduction amount per operation unit time can be increased.

Therefore, changing the specified period in accordance with the device operation efficiency is found to be effective to increase the consumed energy reduction amount.

Here, as the factor related to the device operation efficiency, a consumed energy amount (material gas flow rate) of the fuel cell electric power generator at a predetermined load (500 W in the present embodiment) is measured by a consumed energy amount measuring portion, not shown, provided inside the fuel cell electric power generator, and the obtained value is stored in the storage portion 6a with time. When creating the operation plan, the material gas flow rate is compared with its initial value. In a case where the flow rate is increased, the specified period is set as needed in accordance with the increased value. By creating the operation plan by this configuration, the specified period can be set as needed to correspond to the period corresponding to the electric power load demand and heat load demand. This is effective to increase the consumed energy reduction amount.

In the present embodiment, the consumed energy measuring portion measures the material gas flow rate. However, needless to say, for example, the consumed energy measuring portion may be any device as long as it can measure a necessary material gas amount at a predetermined output, such as a pressure change or a change in the power consumption amount of a material gas supply device.

Modification Example 13

Further, as the factor related to the device operation status, it is effective to use the consumed energy consumed at the time of the device stop.

Even while the fuel cell electric power generator stops, it consumes the energy, such as standby electric power. Therefore, the standby electric power while the fuel cell electric power generator stops is also an important factor for the calculation of the consumed energy B. The consumed energy amount consumed while the generator stops (in the present modification example, the standby electric power amount is measured) is measured by the consumed energy amount measuring portion, not shown, provided in the fuel cell electric power generator, and the obtained value is stored in the storage portion 6a with time. When creating the operation plan, the standby electric power amount is compared with its initial value. In a case where the standby electric power amount is increased, the specified period is set as needed in accordance with the increased value. By creating the operation plan by this configuration, the specified period can be set as needed to correspond to the period corresponding to the electric power load demand and heat load demand. This is effective to increase the consumed energy reduction amount.

Needless to say, the consumed energy measuring portion may be any device as long as it can measure the consumed energy amount generated during the device stop.

Modification Example 14

Further, as the factor related to the device operation status, it is effective to use a total operation time of the energy supply device.

The device operation efficiency of the fuel cell electric power generator and the consumed energy amount consumed while the generator stops change with time. Therefore, the total operation time of the device is measured by an operation time measuring portion (real-time clock), not shown, provided inside the fuel cell electric power generator, and the obtained value and a device aging change parameter corresponding to the total operation time are stored in the storage portion 6a with time. The specified period is set as needed in accordance with the aging change parameter corresponding to the total operation time when creating the operation plan. By creating the operation plan by this configuration, the specified period can be set to correspond to the period corresponding to the electric power load demand and heat load demand. This is effective to increase the consumed energy reduction amount.

Moreover, regarding the change with time, the device status change in a short period of time is small. Therefore, the same effects can be obtained by using the previous time's total operation time in the specified period as this time's total operation time.

The foregoing has explained Embodiment 8 applied to Embodiment 1. However, the same effects can be obtained even if Embodiment 8 is applied to Embodiments 2, 3, or 4.

Moreover, a current set level of the specified period and a current set level of the device operation status are displayed on the environmental condition input means, the device main body, or the other display device via signals. With this, the user can recognize a current device operation status and does not have the status confused with a device operation malfunction. In addition, the user leads a life in accordance with the situation. Therefore, an error between a combination of the predicted electric power load demand and predicted heat load demand and a combination of the actually used electric power load and heat load becomes small. As a result, the operation plan corresponding to the accurate predicted load demand can be created. On this account, the consumed energy reduction amount can be further increased.

(Embodiment 9)

A fuel cell system according to Embodiment 9 of the present invention is applied to the same components as in Embodiments 1, 2, 3, and 4. An example in which a representative example is applied to Embodiment 1 will be explained in reference to FIGS. 1 and 8, and its explanation is omitted.

It is desirable that in Embodiment 1, the maximum operation time Mh be set based on the operation status of the energy supply device to be used.

To be specific, in an operation determination of the conventional fuel cell electric power generator, the operation determination is commanded such that the electric power generator operates when even a small consumed energy reduction amount is obtained. As described above, the fuel cell power generating system can realize high device efficiency in a case where it is operated by high output. In the operation based on the conventional operation determination, the operation may be planned to be carried out by the output by which the device efficiency is comparatively low. In this case, the consumed energy reduction amount per operation unit time of the consumed energy reduction amount generated in the specified period may become a low value. On this account, by setting the maximum operation time Mh in accordance with the load situation, the operation plan of the fuel cell power generating system can be changed from the operation plan significantly including the low output operation to the operation plan mainly including the high output operation. As a result, the consumed energy reduction amount in a life operable time corresponding to device durability can be maximized.

Here, the operation plan (combination of the operation start time and the operation stop time) is variously set such that the total operation time does not exceed the maximum operation time Mh in the specified period. Next, the predicted consumed energy reduction amount in the specified period is calculated. Then, the operation plan is set such that the consumed energy reduction amount per unit operation time in the specified period is maximum, the amount being obtained by dividing the total consumed energy reduction amount obtained in the specified period by the total operation time in the specified period. Then, this operation plan is output to the fuel cell power generating system. With this, it is possible to maximize the consumed energy reduction amount which is obtained by the device in a lifetime.

The maximum operation time Mh is set so as to correspond to the electric power load demand situation and the heat load demand situation. With this, the consumed energy reduction amount can be increased.

For example, in the case of maximizing the consumed energy reduction amount with respect to the predicted electric power load demand and predicted heat load demand, the consumed energy B needs to be calculated. This calculation requires a device operation efficiency (power generation efficiency and heat recovery efficiency). In the case of the fuel cell electric power generator, the power generation efficiency and the heat recovery efficiency changes with time. The power generation efficiency tends to decrease whereas the heat recovery efficiency tends to increase. This largely attribute to the performance of the fuel cell (not shown) configured to convert the hydrogen energy in the fuel cell electric power generator into the electric power energy. The electric power conversion efficiency of the fuel cell deteriorates by an electric power loss caused by an electric power resistive loss increase caused by a temporal increase in electric conductivity of an internal cell (electric power generating body) or by an electric power loss caused by an electromotive force decrease caused by a reaction rate decrease caused by a temporal catalyst deterioration. Moreover, as the other typical temporal loss increase factor, there is an electric power loss increase caused by, for example, a friction loss increase of an actuator (for example, a pump, not shown) configured to cause a fluid (such as a material gas or cooling water) necessary for electric power generation and heat recovery to flow through the system. Further, there is aged deterioration due to the deterioration of parts of a drive circuit portion configured to control each actuator, and the aged deterioration increases as the electric power loss. By the decrease of the power generation efficiency with time, the electric power conversion loss is converted into the heat loss, a part thereof is recovered as the heat, and the heat recovery efficiency tends to increase. On this account, even if the predicted electric power load demand and the predicted heat load demand are constant, changes occur depending on the length of the set maximum operation time Mh.

To be specific, in the device (aged-state device) which has been changed to a state where the power generation efficiency is low and the heat recovery efficiency is high with respect to the device (initial-state device) in a state where the initial power generation efficiency is high and the heat recovery efficiency is low, in a case where the maximum operation time Mh is set to, for example, be maximum in the specified period, the heat load corresponding to the generated electric power which has covered the used electric power exceeds the heat load demand. Therefore, the heat load in the hot water storage unit reaches the heat storage limit, so that the fuel cell electric power generator stops generating the electric power. When the accumulated heat load falls below the heat storage limit, the system starts up again. Thus, it becomes difficult to carry out the operation such that a region where the device output is high is prioritized. In order to avoid the loss of the energy necessary for the start-up at this time and the low output region as much as possible, Mh is limited to as short a period as possible. With this, the operation determination is carried out such that the operation is selectively carried out in the region of a high output used electric power predicted value so as to satisfy a heat load demand predicted value in the specified period. Thus, it is possible to maximize the consumed energy reduction amount per unit operation time.

Further, for example, in a case where the maximum operation time Mh is set to one day in the winter season in which the electric power load demand significantly increases and the heat load demand is large, the heat load corresponding to the generated electric power which has covered the used electric power does not exceed the heat load demand, and the heat load does not reach the heat storage limit of the hot water storage unit even if the system operates continuously. Further, since the electric power load demand is large and the output is high, the operation can be carried out in the region where the device efficiency is also high. On this account, in a case where the maximum operation time Mh is set to be significantly shorter than the specified period, the operation time in which the consumed energy reduction amount is efficiently realized is limited, and the ratio of the energy consumed by the start-up and stop per unit operation time becomes large. This is not desirable to maximize the consumed energy reduction amount per unit operation time. In the case of the above condition, the consumed energy reduction amount per unit time can be maximized by comparatively increasing the maximum operation time Mh even in the case of the aged-state device as with the initial-state device.

Moreover, even in the intermediate season, such as spring or autumn, whose conditions are different from the above conditions, the ratio of the electric power load demand and the heat load demand and the output ratio of the electric power and the heat of the fuel cell electric power generator are different from each other in the initial-state device and the aged-state device. Therefore, by setting the maximum operation time Mh in accordance with the device status and the load status at this time, the operation in the period in which the electric power load demand is low can be eliminated from the operation plan. As a result, the operation output of the fuel cell system can be increased, and the consumed energy reduction amount per operation unit time can be increased.

Therefore, changing the maximum operation time Mh in accordance with the device operation efficiency is found to be effective to increase the consumed energy reduction amount.

Here, as the factor related to the device operation efficiency, a consumed energy amount (material gas flow rate) of the fuel cell electric power generator at a predetermined load (500 W in the present modification example) is measured by a consumed energy amount measuring portion, not shown, provided inside the fuel cell electric power generator, and the obtained value is stored in the storage portion 6a with time. When creating the operation plan, the material gas flow rate is compared with its initial value. In a case where the flow rate is increased, the maximum operation time Mh is set as needed in accordance with the increased value. By creating the operation plan by this configuration, the maximum operation time Mh can be set as needed to correspond to the period corresponding to the electric power load demand and heat load demand. This is effective to increase the consumed energy reduction amount.

In the present modification example, the consumed energy measuring portion measures the material gas flow rate. However, needless to say, for example, the consumed energy measuring portion may be any device as long as it can measure a necessary material gas amount at a predetermined output, such as a pressure change or a change in the power consumption amount of the material gas supply device.

Modification Example 15

Further, as the factor related to the device operation status, it is effective to use the consumed energy consumed at the time of the device stop.

Even while the fuel cell electric power generator stops, it consumes the energy, such as standby electric power. Therefore, the standby electric power while the fuel cell electric power generator stops is also an important factor for the calculation of the consumed energy B. The consumed energy amount consumed while the generator stops (in the present modification example, the standby electric power amount is measured) is measured by the consumed energy amount measuring portion, not shown, provided in the fuel cell electric power generator, and the obtained value is stored in the storage portion 6a with time. When creating the operation plan, the standby electric power amount is compared with its initial value. In a case where the standby electric power amount is increased, the maximum operation time Mh is set as needed in accordance with the increased value. By creating the operation plan by this configuration, the maximum operation time Mh can be set as needed to correspond to the period corresponding to the electric power load demand and heat load demand. This is effective to increase the consumed energy reduction amount.

Needless to say, the consumed energy measuring portion may be any device as long as it can measure the consumed energy amount generated during the device stop.

Modification Example 16

Further, as the factor related to the device operation status, it is effective to use a total operation time of the energy supply device.

The device operation efficiency of the fuel cell electric power generator and the consumed energy amount consumed while the generator stops change with time. Therefore, the total operation time of the device is measured by an operation time measuring portion (real-time clock), not shown, provided inside the fuel cell electric power generator, and the obtained value and a device aging change parameter corresponding to the total operation time are stored in the storage portion 6a with time. The maximum operation time Mh is set as needed in accordance with the aging change parameter corresponding to the total operation time when creating the operation plan. By creating the operation plan by this configuration, the maximum operation time Mh can be set to correspond to the period corresponding to the electric power load demand and heat load demand. This is effective to increase the consumed energy reduction amount.

Moreover, regarding the change with time, the device status change in a short period of time is small. Therefore, the same effects can be obtained by using the previous time's total operation time in the maximum operation time Mh as this time's total operation time.

The foregoing has explained Embodiment 8 applied to Embodiment 1. However, the same effects can be obviously obtained even if Embodiment 8 is applied to Embodiments 2, 3, or 4.

Moreover, a current set level of the maximum operation time Mh and a current set level of the device operation status are displayed on the environmental condition input means, the device main body, or the other display device via signals. With this, the user can recognize a current device operation status and does not have the status confused with a device operation malfunction. In addition, the user leads a life in accordance with the situation. Therefore, an error between a combination of the predicted electric power load demand and predicted heat load demand and a combination of the actually used electric power load and heat load becomes small. As a result, the operation plan corresponding to the accurate predicted load demand can be created. On this account, the consumed energy reduction amount can be further increased.

Other Configurations

As can be understood from the above explanation, the energy supply system of the present invention may have the following configurations.

The energy supply system of the present invention may be an energy supply device configured to supply at least one of the electric power and the heat based on a predetermined operation pattern and may be configured to include a maximum operation time setting device configured to set the maximum operation time of the specified period.

In accordance with the energy supply system configured as above, the operation can be continued without the operation time of the energy supply system reaching the operation time life before the guaranteed operation period lapses.

Moreover, in the energy supply system of the present invention, the maximum operation time may be a constant value.

Moreover, in the energy supply system of the present invention, the maximum operation time may change in accordance with a predetermined pattern.

Moreover, in the energy supply system of the present invention, the specified period may be a constant value.

Moreover, in the energy supply system of the present invention, the specified period may change in accordance with a predetermined pattern.

Moreover, the energy supply system of the present invention may be configured to include an environmental load calculating device configured to calculate an environmental load in accordance with the operation of the energy supply device and an operation planning device configured to plan the operation of the energy supply device, and the operation planning device may plan the operation such that in a case where the operation time of the energy supply system in the specified period in accordance with the predetermined operation pattern is longer than the maximum operation time, the system is operated only for the maximum operation time in the predetermined operation pattern such that the environmental load becomes a minimum value.

Moreover, in the energy supply system of the present invention, the environmental load calculating device may calculate the energy reduction amount per unit operation time of the energy supply device, and the operation planning device may plan the operation such that the system is operated only for the maximum operation time in the predetermined operation pattern such that the energy reduction amount per unit operation time is maximum.

Moreover, in the energy supply system of the present invention, the environmental load calculating device may calculate the energy reduction amount per unit time of the specified period, and the operation planning device may plan the operation such that the system is operated only for the maximum operation time in the predetermined operation pattern such that the energy reduction amount per unit time is maximum.

Moreover, in the energy supply system of the present invention, the environmental load calculating device may calculate the energy reduction amount in a predetermined period, and the operation planning device may plan the operation such that the system is operated only for the maximum operation time in the predetermined operation pattern such that the energy reduction amount in the predetermined period is maximum.

Moreover, in the energy supply system of the present invention, the environmental load calculating device may calculate the energy consumption of the energy supply device, and the operation planning device may plan the operation such that the system is operated only for the maximum operation time in the predetermined operation pattern such that the energy consumption of the energy supply device is minimum.

Moreover, in the energy supply system of the present invention, the environmental load calculating device may calculate the consumed energy reduction amount of an object to which the energy is supplied, and the operation planning device may determine a predetermined operation pattern such that the consumed energy reduction amount is maximum.

Moreover, the energy supply system of the present invention may be configured to operate based on a predetermined operation pattern so as to start up at a predetermined time and stop at a predetermined time.

Moreover, in the energy supply system of the present invention, the energy supply device may be a heat-electric power supply device configured to supply the electric power and the heat, may include a heat accumulator configured to accumulate the heat generated in a heat-electric power supply system, and may operate such that the heat accumulated by the heat accumulator is maximum.

Moreover, the energy supply system of the present invention may be configured to include an operation pattern setting device configured such that the predetermined operation pattern is externally set.

Moreover, in the energy supply system of the present invention, the maximum operation time setting device may not set the maximum operation time in a case where a predetermined condition is satisfied.

Moreover, in the energy supply system of the present invention, the predetermined condition may be a period set based on external information that is at least one of the calendar information, the season information, and the outside air temperature.

Moreover, in the energy supply system of the present invention, the predetermined condition may be a period set based on the status of the energy supply device.

Moreover, in the energy supply system of the present invention, the predetermined condition may be a predetermined period which has elapsed since a first operation of the energy supply device.

Moreover, in the energy supply system of the present invention, the predetermined condition may be a predetermined period which has elapsed since the start-up, such as the power-on, of the energy supply device.

Moreover, in the energy supply system of the present invention, the predetermined condition may be a predetermined period which has elapsed since comeback of the energy supply device from failure.

Moreover, in the energy supply system of the present invention, the predetermined condition may be a period in which the operation efficiency of the energy supply device is a predetermined value or higher.

Moreover, in the energy supply system of the present invention, the maximum operation time setting device may change the maximum operation time in accordance with the environmental condition.

Moreover, the energy supply system of the present invention may be configured to include a period setting device configured to set the specified period, and the period setting device may change the specified period in accordance with the environmental condition.

Moreover, the energy supply system of the present invention may be configured to use at least one of the season information and the calendar information as the environmental condition.

Moreover, the energy supply system of the present invention may be configured to use the outside air temperature as the environmental condition.

Moreover, the energy supply system of the present invention may be configured to use the city water temperature as the environmental condition.

Moreover, the energy supply system of the present invention may be configured to include an energy consumption memory configured to store the energy consumption of an object to which the energy supply device supplies the energy and may be configured to use the energy consumption as the environmental condition.

Moreover, the energy supply system of the present invention may be configured to include the environmental condition input device configured such that the environmental condition is externally input.

Moreover, in the energy supply system of the present invention, the maximum operation time setting device may change the maximum operation time in accordance with the status of the energy supply device.

Moreover, the energy supply system of the present invention may be configured to include the period setting device configured to set the specified period, and the period setting device may change the specified period in accordance with the status of the energy supply device.

Moreover, the energy supply system of the present invention may be configured to use the operation efficiency of the energy supply device as the status of the energy supply device.

Moreover, the energy supply system of the present invention may be configured to use as the status of the energy supply device the consumed energy consumed during the operation of the energy supply device.

Moreover, the energy supply system of the present invention may be configured to use the total operation time of the energy supply device as the status of the energy supply device.

Moreover, the energy supply system of the present invention may be configured to use the total operation time of the energy supply device in the previous specified period as the status of the energy supply device.

In the energy supply system of the present invention, components and matters described in the above embodiments and modification examples can be combined arbitrarily and suitably. Needless to say, a desired effect can be obtained by each combination.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The details of structures and/or functions may be substantially modified within the spirit of the present invention.

Industrial Applicability

The energy supply system of the present invention is an energy supply system configured to create an operation plan and is useful as an energy supply system capable of optimizing the operation plan in accordance with an actual operation situation.

What is claimed is:

1. An energy supply system comprising:
an energy supply device configured to supply at least one of electric power and heat; and
a remote controller configured to, by remotely transferring information via communication to the energy supply device:
set a first maximum operation time of a first specified period including a plurality of second specified periods, the first maximum operation time being an upper limit of an operation time of the energy supply device in the first specified period;
calculate and set a second target maximum operation time of each of the second specified periods of the first specified period based on the set first maximum operation time such that the operation time of the energy supply device in the first specified period does not exceed the first maximum operation time, the second target maximum operation time being a target value of an upper limit of the operation time of the energy supply device in the second specified period; and
reconfigure the second target maximum operation time of a future second specified period of a certain first specified period based on a time in which the energy supply device has been actually operated in a past second specified period of the first specified period.

2. The energy supply system of claim 1, wherein the reconfiguration occurs after each second specified period.

3. The energy supply system of claim 1, wherein each of the reconfigured second target maximum operation time provides maximum energy cost reduction per unit time of the remaining first specified period.

4. An energy supply system comprising:
an energy supply device configured to supply at least one of electric power and heat; and
a remote control device configured to, by remotely transferring information via communication to the energy supply device:
set a first maximum number of times of start-ups of a first specified period including a plurality of second specified periods, the first maximum number of start-ups being an upper limit of a number of start-ups of the energy supply device in the first specified period;
calculate and set a second target maximum number of start-ups of each of the second specified periods of the first specified period based on the set first maximum number of start-ups such that the number of start-ups of the energy supply device in the first specified period does not exceed the first maximum number of start-ups, the second target maximum number of start-ups being a target value of an upper limit of the number of start-ups of the energy supply device in the second specified period; and
reconfigure the second target maximum number of start-ups of a future second specified period of a certain first specified period based on a number of times which the energy supply device has been actually started up in a past second specified period of the first specified period.

5. The energy supply system of claim 4, wherein the reconfiguration occurs after each second specified period.

6. An energy supply system comprising:
an energy supply device configured to supply at least one of electric power and heat; and
a remote control device configured to, by remotely transferring information via communication to the energy supply device, set a maximum number of start-ups of a specified period, the maximum number of start-ups being an upper limit of a number of start-ups of the energy supply device in the specified period.

7. A method of reconfiguring an operational plan for an energy supply device over a first specified period including a plurality of secondary specified periods, the method comprising the steps of:
setting in the energy supply device a first maximum operation time of the first specified period, the first maximum operation time being an upper limit of an operation time of the energy supply device in the first specified period;
calculating and setting in the energy supply device a second target maximum operation time of each of the second specified periods of the first specified period based on the set first maximum operation time such that the operation time of the energy supply device in the first specified period does not exceed the first maximum operation time, the second target maximum operation time being a target value of an upper limit of the operation time of the energy supply device in the second specified period; and
reconfiguring the second target maximum operation times of one or more of future second specified periods of a certain first specified period based on a time in which the energy supply device has been actually operated in a past second specified period of the first specified period.

8. The method of claim 7, wherein information for the steps of setting are remotely transferred by communication to the energy supply device by a remote controller.

* * * * *